United States Patent
Asano

(10) Patent No.: US 12,538,017 B2
(45) Date of Patent: Jan. 27, 2026

(54) CONTROL SYSTEM, IMAGE CAPTURING APPARATUS AND CONTROL METHOD THEREOF, AND STORAGE MEDIUM

(71) Applicant: CANON KABUSHIKI KAISHA, Tokyo (JP)

(72) Inventor: Nao Asano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 18/797,640

(22) Filed: Aug. 8, 2024

(65) Prior Publication Data

US 2025/0071417 A1    Feb. 27, 2025

(30) Foreign Application Priority Data

Aug. 23, 2023    (JP) ................. 2023-135794

(51) Int. Cl.
*H04N 23/661* (2023.01)
*H04N 23/667* (2023.01)
*H04N 23/67* (2023.01)

(52) U.S. Cl.
CPC .......... *H04N 23/661* (2023.01); *H04N 23/67* (2023.01); *H04N 23/667* (2023.01)

(58) Field of Classification Search
CPC ..... H04N 23/67; H04N 23/661; H04N 23/667
USPC ...................................................... 348/211.2
See application file for complete search history.

(56) References Cited

U.S. PATENT DOCUMENTS

| | | | |
|---|---|---|---|
| 9,583,144 B2* | 2/2017 | Ricciardi ............. | G11B 27/34 |
| 10,432,897 B2* | 10/2019 | Carey ................... | H04N 7/181 |
| 10,469,553 B2* | 11/2019 | Wogsberg ............. | H04N 7/181 |
| 10,942,872 B2* | 3/2021 | Toyoda ................. | G10L 15/22 |
| 11,025,877 B2* | 6/2021 | Kaneko ................ | H04N 9/8205 |
| 11,196,915 B2* | 12/2021 | Ishii .................... | G08B 13/19682 |
| 11,323,679 B2* | 5/2022 | Kaneko ................ | H04N 5/268 |
| 11,343,544 B2* | 5/2022 | Larrew ................ | H04N 21/23103 |
| 11,750,913 B2* | 9/2023 | Mizuma ............... | H04N 23/69 |
| | | | 348/207.1 |
| 12,010,419 B2* | 6/2024 | Mizuma ............... | H04N 23/62 |

(Continued)

OTHER PUBLICATIONS

"NX Field System User Manual," from https://nps.nikonimaging.com/technical_info/nx_field/pdf/NXFieldUM_Jp_ver.1.3.pdf (with partial translation) (2021).

(Continued)

*Primary Examiner* — Pritham D Prabhakher
(74) *Attorney, Agent, or Firm* — Venable LLP

(57) ABSTRACT

A control system in which an image capturing apparatus is controlled by a plurality of control apparatuses, wherein each control apparatus includes a first communication unit that communicates with the image capturing apparatus, a first instruction unit that outputs an instruction to start or stop an autofocus operation, and a second instruction unit that outputs an instruction to start or stop a shooting operation. The image capturing apparatus includes a second communication unit, an image capturing device, an optical imaging system, and a control unit. When the instruction to start the shooting operation is first received from any one control apparatus, the control unit performs control to start the shooting operation, and continue the shooting operation until the instruction to stop the shooting operation is received from all of the control apparatuses.

15 Claims, 16 Drawing Sheets

(56) References Cited

U.S. PATENT DOCUMENTS

| | | | |
|---|---|---|---|
| 2014/0211027 A1* | 7/2014 | Worrill | H04N 21/2187 348/207.11 |
| 2015/0043886 A1* | 2/2015 | Bang | G11B 27/031 386/223 |
| 2016/0247537 A1* | 8/2016 | Ricciardi | G06V 20/42 |
| 2017/0237795 A1* | 8/2017 | Wogsberg | H04N 21/4314 709/219 |
| 2017/0318274 A9* | 11/2017 | Feinson | H04N 9/8227 |
| 2018/0048988 A1* | 2/2018 | Koike | H04W 76/14 |
| 2019/0107845 A1* | 4/2019 | Kaine | G05D 1/104 |
| 2019/0191139 A1* | 6/2019 | Kaneko | H04N 9/8205 |
| 2019/0324925 A1* | 10/2019 | Toyoda | G06F 13/102 |
| 2021/0250566 A1* | 8/2021 | Kaneko | H04N 5/91 |
| 2021/0289194 A1* | 9/2021 | May | H04N 13/282 |
| 2021/0409791 A1* | 12/2021 | Larrew | H04N 21/23103 |
| 2022/0159179 A1* | 5/2022 | Mizuma | H04N 23/661 |
| 2023/0069440 A1* | 3/2023 | Kamba | H04N 23/661 |
| 2023/0362475 A1* | 11/2023 | Mizuma | H04N 23/661 |
| 2023/0412918 A1* | 12/2023 | Wataru | H04N 23/90 |

OTHER PUBLICATIONS

"How to Use the Remote Camera Tool," from https://support.d-imaging.sony.co.jp/app/remotecameratool/ja/instruction/1_connection.php.

"How to Use the Remote Camera Tool," from https://support.d-imaging.sony.co.jp/app/remotecameratool/en/instruction.

* cited by examiner

FIG. 7

| SESSION ID (701) | AUTOFOCUS COMMAND STATE FLAG (702) | SHOOTING COMMAND STATE FLAG (703) |
|---|---|---|
| 0×41 | START | STOP |
| 0×56 | STOP | START |
| 0×9F | STOP | STOP |
| 0×AF | STOP | STOP |
| | | |

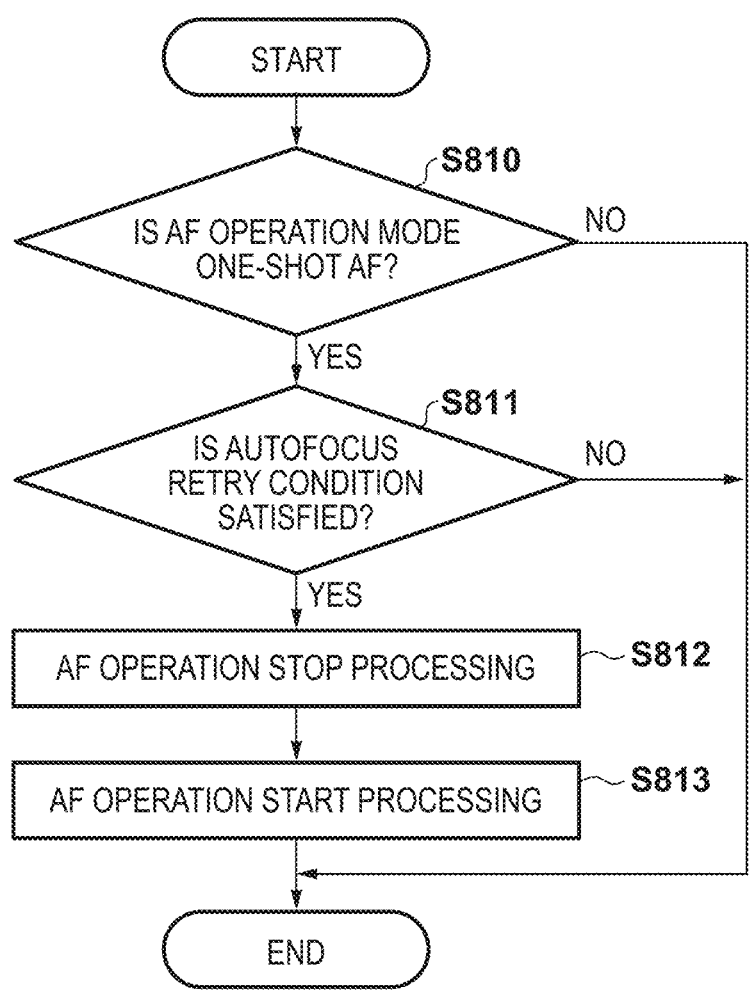

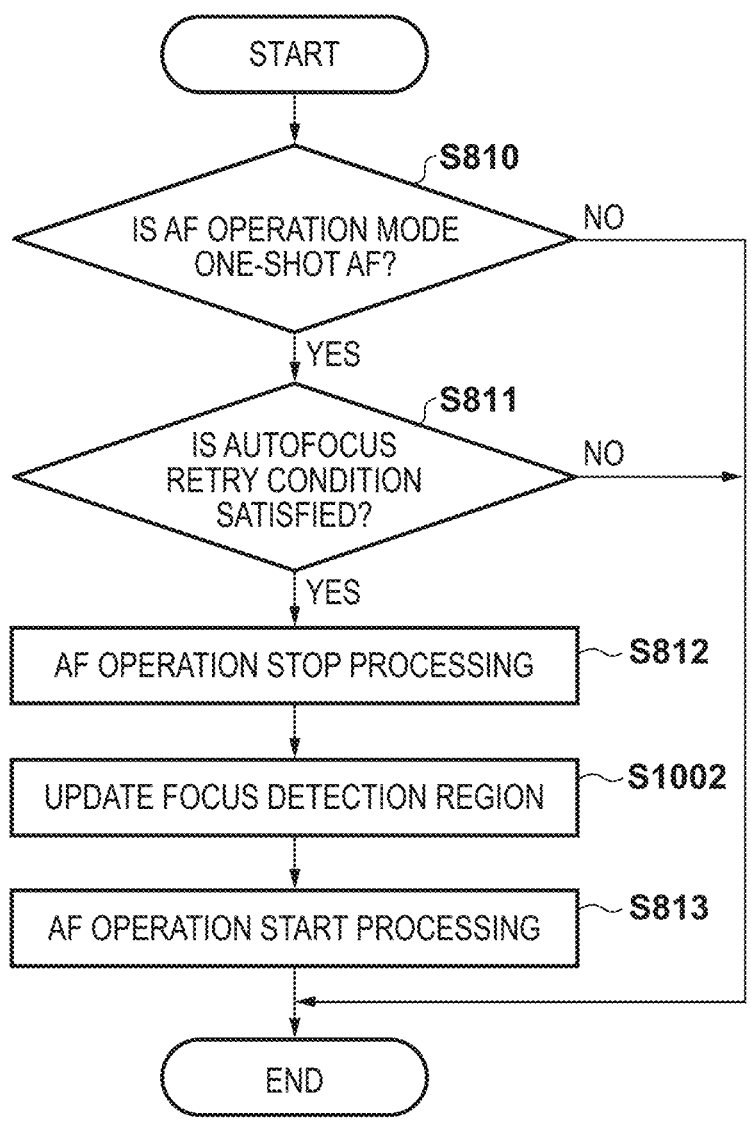
F I G. 10B

CONTROL SYSTEM, IMAGE CAPTURING APPARATUS AND CONTROL METHOD THEREOF, AND STORAGE MEDIUM

BACKGROUND OF THE INVENTION

Field of the Invention

The present invention relates to a control system in which an image capturing apparatus is controlled by a plurality of control apparatuses.

Description of the Related Art

In recent years, photographers at sporting events such as the Olympics shoot a wide range of scenes from various competitions, and the photographs taken are often distributed throughout the news media.

In such competitions, systems are used in which a plurality of digital cameras are installed facing in a variety of angles, and those cameras can be remotely controlled using portable control apparatuses. In such a system, a small number of photographers can control a plurality of digital cameras at once by operating the control apparatuses, which are, for example, tablets or laptop computers connected to the cameras over a network.

Existing technologies such as Nikon Corporation's "NX Field" and Sony Corporation's "Remote Camera Tool" are sometimes used as software capable of remotely controlling photography by a plurality of digital cameras. Document 1 (Nikon "NX Field System User Manual". Retrieved Aug. 15, 2023, from https://nps.nikonimaging.com/technical_info/nx_field/pdf/NXFieldUM_Jp_ver.1. 3.pdf) and Document 2 ("How to Use the Remote Camera Tool". Retrieved Aug. 15, 2023, from https://support.d-imaging.sony.co.jp/app/remotecameratool/ja/instruction/1_connection.php) disclose methods for using this software.

However, when shooting sporting events such as soccer competitions, where the players, who are subjects, move throughout a wide venue, it is difficult for photographers to predict how the subjects will move, even when using such software. Therefore, when a single photographer controls a plurality of digital cameras using a single control apparatus, the following problem will arise. The photographer needs to confirm whether the subject is within the angle of view of the plurality of digital cameras, but the photographer may not be able to pay attention to all of the digital cameras and may therefore miss their chance to take a shot using one of the digital cameras.

What is needed, therefore, is a remote photography system in which a plurality of control apparatuses can be connected to a network and a plurality of photographers can operate the respective control apparatuses to shoot images using digital cameras so as not to miss chances to take shots.

When shooting a still image using a digital camera, a photographer focuses the shot using autofocus in accordance with the movement of the subject, and shoots a photograph.

However, when shooting a still image using a remote photography system, a photographer can control the timing at which autofocus of the digital camera operates by sending autofocus start commands and stop commands from the control apparatus. Similarly, the timing at which the digital camera takes a shot can be controlled by sending shooting start commands and stop commands.

However, with existing technologies such as the aforementioned NX Field and Remote Camera Tool, there are situations where the autofocus of the digital camera or the timing of the shooting operation cannot be controlled from a plurality of control apparatuses within the same period.

For example, the following problem occurs in a system having a limitation in which when a digital camera is already taking a shot in response to a shooting start command from a given control apparatus, the digital camera does not accept shooting start commands from other control apparatuses. Specifically, when a digital camera is taking a shot in response to a shooting start command already sent from one photographer, and another photographer sends a shooting start command to shoot a photograph from another control apparatus, the digital camera will not accept that shooting start command. It is therefore necessary for the other photographer to send a start command from the control apparatus again to cause the digital camera start shooting after the digital camera has finished taking the first shot. However, there is a risk that the other photographer will miss their chance for a shot during that period of time.

This problem arises in a similar manner with autofocus control. For example, the following problem occurs in a system having a limitation in which when a digital camera is already performing autofocus operations in response to an autofocus start command from one control apparatus, the digital camera does not accept autofocus start commands from other control apparatuses. Specifically, when a digital camera is performing autofocus in response to an autofocus start command already sent from one photographer, and another photographer sends an autofocus start command to prepare to shoot a photograph from another control apparatus, the digital camera will not accept that autofocus start command. It is therefore necessary for the other photographer to send a start command from the control apparatus again to cause the digital camera to perform autofocus after the digital camera has finished performing the first instance of autofocus. However, there is a risk that the other photographer will be late to prepare to take their shot, and miss their chance for the shot, during that period of time.

SUMMARY OF THE INVENTION

Having been achieved in light of the above-described problems, the present invention provides a control system that reduces the likelihood of a photographer missing a chance to take a shot even when an image capturing apparatus is controlled by a plurality of control apparatuses.

According to a first aspect of the present invention, there is provided a control system in which an image capturing apparatus is controlled by a plurality of control apparatuses, wherein each control apparatus includes: at least one processor or circuit configured to function as: a first communication unit that communicates with the image capturing apparatus; a first instruction unit that outputs, to the image capturing apparatus, an instruction to start or stop an autofocus operation, the instruction being an instruction related to the autofocus operation; and a second instruction unit that outputs, to the image capturing apparatus, an instruction to start or stop a shooting operation, the instruction being an instruction related to the shooting operation, the image capturing apparatus includes: at least one processor or circuit configured to function as: a second communication unit that communicates with each of the control apparatuses; and a control unit; an image capturing device that performs the shooting operation; and an optical imaging system that performs the autofocus operation, wherein when the instruction to start the shooting operation is first received from any one control apparatus among the plurality of control apparatuses, the control unit performs control to start the shooting operation, and continue the shooting operation until the instruction to stop the shooting operation is received from all of the control apparatuses that have sent the instruction to start the shooting operation, and when the instruction to start the autofocus operation is first received from any one control apparatus among the plurality of control apparatuses, the control unit performs control to start the autofocus operation, and continue the autofocus operation until the instruction to stop the autofocus operation is received from all the control apparatuses that have sent the instruction to start the autofocus operation.

According to a second aspect of the present invention, there is provided an image capturing apparatus controlled by a plurality of control apparatuses, the image capturing apparatus comprising: at least one processor or circuit configured to function as: a communication unit that communicates with each of the control apparatuses; and a control unit; an image capturing device that performs the shooting operation; and an optical imaging system that performs the autofocus operation, wherein when the instruction to start the shooting operation is first received from any one control apparatus among the plurality of control apparatuses, the control unit performs control to start the shooting operation, and continue the shooting operation until the instruction to stop the shooting operation is received from all of the control apparatuses that have sent the instruction to start the shooting operation, and when the instruction to start the autofocus operation is first received from any one control apparatus among the plurality of control apparatuses, the control unit performs control to start the autofocus operation, and continue the autofocus operation until the instruction to stop the autofocus operation is received from all the control apparatuses that have sent the instruction to start the autofocus operation.

According to a third aspect of the present invention, there is provided a method of controlling an image capturing apparatus that is controlled by a plurality of control apparatuses, the image capturing apparatus including at least one processor or circuit configured to function as a communication unit that communicates with the control apparatuses, an image capturing device that performs a shooting operation, and an optical imaging system that performs an autofocus operations, the method comprising: when an instruction to start the shooting operation is first received from any one of the plurality of control apparatuses, performing control to start the shooting operation, and continue the shooting operation until an instruction to stop the shooting operation is received from all of the control apparatuses that have sent the instruction to start the shooting operation; and when an instruction to start the autofocus operation is first received from any one of the plurality of control apparatuses, performing control to start the autofocus operation, and continue the autofocus operation until an instruction to stop the autofocus operation is received from all the control apparatuses that have sent the instruction to start the autofocus operation.

Further features of the present invention will become apparent from the following description of exemplary embodiments with reference to the attached drawings.

BRIEF DESCRIPTION OF THE DRAWINGS

FIG. 7 is a diagram illustrating an example of a remote control information list stored in the digital camera.

FIG. 8B is a flowchart illustrating operations performed by the digital camera according to the second embodiment.

FIG. 10B is a flowchart illustrating operations performed by the digital camera according to the third embodiment.

DESCRIPTION OF THE EMBODIMENTS

Figure 1A:
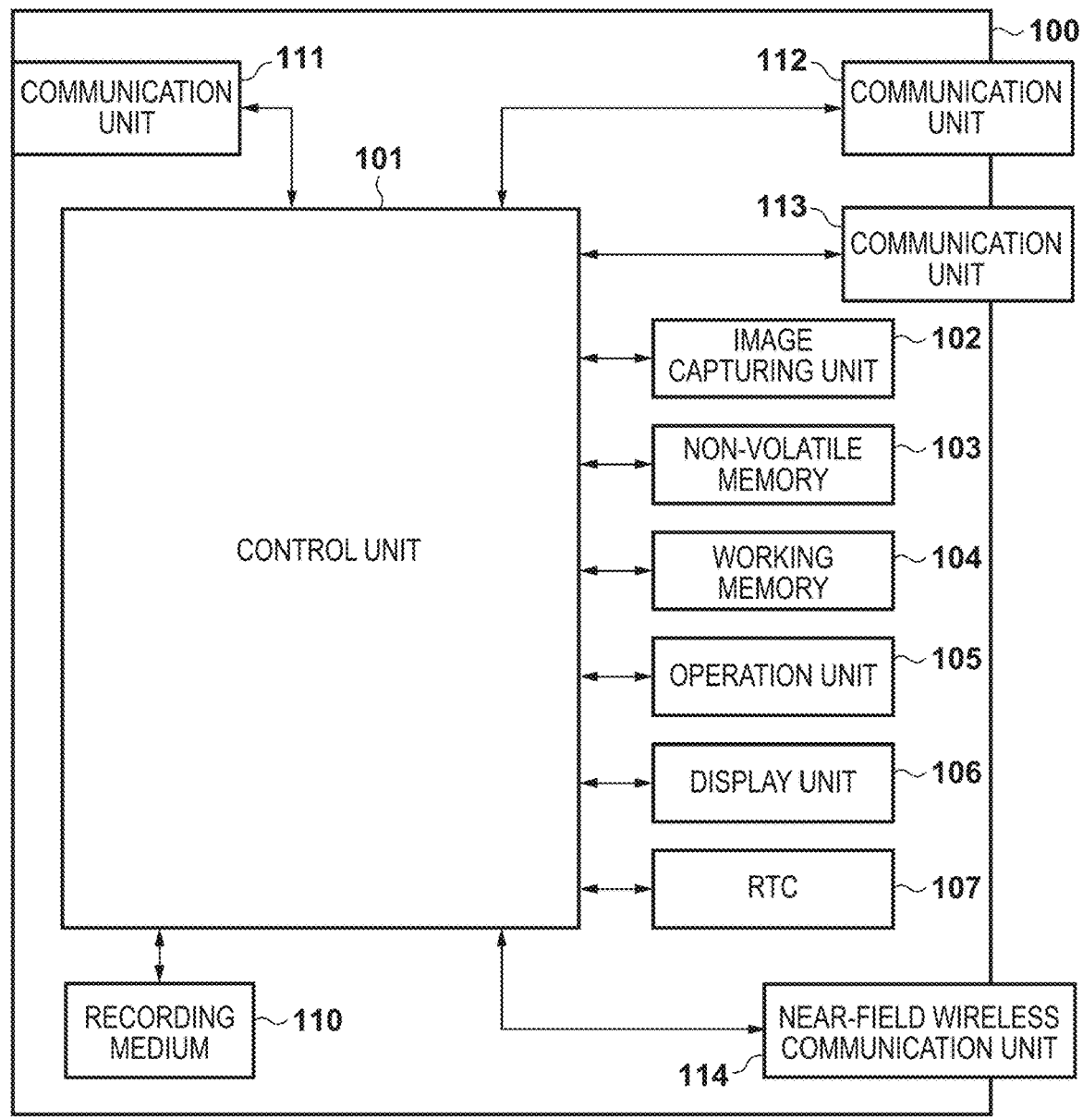
FIGS. 1A to 1C are hardware configuration diagrams illustrating the configuration of a digital camera.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration of Digital Camera 100

FIG. 1A is a hardware configuration diagram illustrating an example of the configuration of a digital camera (image capturing apparatus) 100 in a camera control system according to a first embodiment of the present invention. A case where a digital camera is used as an example of a control apparatus included in the camera control system will be described here, but the control apparatus is not limited thereto. For example, the control apparatus may be any information processing apparatus, such as a portable media player, what is known as a "tablet device", a personal computer, or the like.

In the digital camera 100, a control unit 101 controls the various parts of the digital camera 100 in response to input signals, programs (described later), and the like. Note that a plurality of pieces of hardware may control the overall apparatus by sharing processing, rather than the control unit 101 controlling the overall apparatus.

An image capturing unit 102 is constituted by, for example, an optical imaging system that controls an optical lens unit as well as aperture stop, zoom, and focus, an image sensor for converting an optical image formed through the optical lens unit into an electrical image signal, and the like. A Complementary Metal Oxide Semiconductor (CMOS) sensor, a Charge Coupled Device (CCD), or the like is typically used as the image sensor.

Under the control of the control unit 101, the image capturing unit 102 uses the image sensor to convert subject light, formed as an image by a lens included in the image capturing unit 102, into an electrical signal, performs noise reduction processing and the like, and outputs digital image data. The digital camera 100 according to the present embodiment records image data files into a recording medium 110 in accordance with the design rule for camera filesystem (DCF) standard.

A non-volatile memory 103 is a non-volatile memory that can be electrically erased and recorded to, and stores programs and the like (described later) that are executed by the control unit 101. A working memory 104 is used as a buffer memory that temporarily stores the image data captured by the image capturing unit 102, an image display memory for a display unit 106, a work region for the control unit 101, and the like.

An operation unit 105 is used for accepting instructions made to the digital camera 100 by a user. The operation unit 105 includes, for example, a power button through which the user instructs the power of the digital camera 100 to be turned on and off, a release switch for instructing a shot to be taken, a playback button for instructing image data to be played back, and the like. The operation unit 105 further includes operation members such as a dedicated "connect" button for starting communication with an external device via a communication unit 111 (described later). The operation unit 105 also includes a touch panel 105*d* disposed on the display unit 106 (described later).

Note that the release switch has a state in which the switch is not being pressed, a fully-pressed state in which a pushbutton is pushed fully to an end of possible movement (SW2), and a half-pressed state between the two (SW1). When the release switch enters the SW1 state, a shooting preparation operation start command, i.e., a shooting preparation command, is output from the control unit 101. In the shooting preparation operation, operations such as autofocus (AF) processing, automatic exposure (AE) processing, auto white balance (AWB) processing, flash pre-emission (EF) processing, and the like are performed.

When the release switch is further operated to the SW2 state after the shooting preparation operations are performed in the SW1 state, the control unit 101 outputs a shooting operation start command, whereupon the shooting operation is performed and an image is written into the recording medium 110. If a continuous shooting mode is set, and the release switch is in the SW2 state, shots are repeatedly taken during the shooting operations until the release switch is no longer being pressed or the release switch enters the SW1 state. In other words, as long as the release switch remains in the SW2 state, shots are taken continuously and a plurality of images are shot in sequence. When the release switch changes from the SW2 state to another state, i.e., to the SW1 state or the unpressed state, the control unit 101 outputs a shooting stop command and the continuous shooting operation ends.

The operation unit 105 also includes an AF-ON button that instructs only the AF processing in the shooting preparation operations to be performed. When the AF-ON button is pressed, an AF operation start command is output from the control unit 101, and the AF processing is started.

Note that a mode for the AF operation (an AF operation mode) can be set for the digital camera 100 through the operation unit 105. AF operation modes include one-shot AF, which is suitable for capturing images of a stationary subject, and servo AF (continuous AF), which is suitable for capturing images of a moving subject. These modes are selectively set through the operation unit 105.

In AF operations in one-shot AF, when the AF operation start command is output from the control unit 101, automatic focus detection is performed in a focus detection region selected by the user as desired. The focus lens included in the shooting lens is then moved to an in-focus position, the driving of the focus lens is stopped, and the position of the focus lens is then fixed until an AF operation stop command is output (called "AF lock" hereinafter).

On the other hand, in AF operations in servo AF, movement of a main subject is detected even after the focus lens has been moved to the in-focus position. Then, when movement of the main subject is detected, the focus lens is continuously driven in accordance with a defocus amount detected in the focus detection region. In other words, the focus lens continues to be driven to bring the main subject into focus until an AF operation stop command is output from the control unit 101.

In addition, the digital camera 100 can, using the operation unit 105, be set to a tracking AF mode in which the focus detection region is moved to automatically track the movement of the subject. The tracking AF mode can be used in combination with one-shot AF or servo AF.

The display unit 106 displays a viewfinder image at the time of shooting, shot image data, text for interactive operations, and the like. Note that the display unit 106 does not absolutely need to be built into the digital camera 100. It is sufficient for the digital camera 100 to be capable of connecting to an internal or external display unit 106 and have at least a display control function for controlling the display in the display unit 106.

An RTC 107 manages time. The time is managed based on time settings input by a user through the operation unit 105, time information obtained through the communication unit 111, time information obtained by a radio wave clock, and or the like. Any method can be used to input the time as long as the time can be managed.

The recording medium 110 records image data output from the image capturing unit 102. The recording medium 110 may be configured to be removable from the digital camera 100, or may be built into the digital camera 100. In other words, it is sufficient for the digital camera 100 to at least have means for accessing the recording medium 110.

The communication unit 111 is an interface for connecting to an external device. The digital camera 100 of the present embodiment can exchange data with the external device through the communication unit 111. For example, the image data generated by the image capturing unit 102 can be sent to the external device through the communication unit 111. In the present embodiment, the communication unit 111 includes an interface for communicating with an external device through what is known as "wireless LAN", based on the IEEE 802.11 standard. The control unit 101 implements wireless communication with the external device by controlling the communication unit 111. Note that the communication method is not limited to wireless LAN, and includes an infrared communication method as well, for example.

A communication unit 112 is an interface for connecting to an external device. The digital camera 100 of the present embodiment can exchange data with the external device through the communication unit 112. For example, the image data generated by the image capturing unit 102 can be sent to the external device through the communication unit 112. In the present embodiment, the communication unit 112 includes an interface for communicating with an external device through what is known as "Bluetooth" (registered trademark), based on the IEEE 802.15.1 standard. The control unit 101 implements wireless communication with the external device by controlling the communication unit 112. Note that the communication method is not limited to Bluetooth, and includes wireless LAN known from the IEEE 802.11 standard or an infrared communication method as well, for example.

A communication unit 113 is an interface for connecting to an external device. The digital camera 100 of the present embodiment can exchange data with the external device through the communication unit 113. For example, the image data generated by the image capturing unit 102 can be sent to the external device through the communication unit 113. In the present embodiment, the communication unit 113 includes an interface for communicating with an external device through wired LAN (Ethernet), based on the IEEE 802.3 standard. The control unit 101 implements communication with the external device by controlling the communication unit 113. Note that the communication method is not limited to wired LAN, and includes a USB communication method as well, for example.

Note that the communication unit 112 of the digital camera 100 according to the present embodiment has a "peripheral mode" and a "central mode" as operating modes. By operating the communication unit 112 in the peripheral mode, the digital camera 100 according to the present embodiment can operate as a client device according to Bluetooth. When the digital camera 100 operates as a client device, communication is possible by connecting to an external device that is set to the central mode. To authenticate the external device which is connected to, unique information of the external device being connected to is stored in the non-volatile memory 103 by performing pairing in advance. Additionally, if power is supplied to the Bluetooth module, the digital camera 100 is capable of transmission even when the power switch is turned off.

A near-field wireless communication unit 114 is constituted by, for example, an antenna for wireless communication, a modulation/demodulation circuit and a communication controller for processing wireless signals, and the like. The near-field wireless communication unit 114 outputs modulated wireless signals from the antenna and demodulates wireless signals received from the antenna to implement non-contact near field communication according to the ISO/IEC 18092 standard (known as "Near-Field Communication" (NFC)). The near-field wireless communication unit 114 according to the present embodiment is disposed on a side part of the digital camera 100.

Communication between the digital camera 100 and a control apparatus 200 (described later) is started, and a connection is established, by bringing the near-field wireless communication unit 114 and a near-field wireless communication unit 214 into proximity with each other. Note that when a connection is established with the control apparatus 200 using the near-field wireless communication unit 114, it is not absolutely necessary to bring the near-field wireless communication unit 114 and the near-field wireless communication unit 214 into contact with each other. The near-field wireless communication unit 114 and the near-field wireless communication unit 214 can communicate even when separated by a certain distance, and thus to connect the devices to each other, it is sufficient to bring the units into a range where near-field wireless communication is possible. The following descriptions will also refer to bringing the units into a range where near-field wireless communication is possible as bringing the units "near" or "into proximity with" each other.

Figure 1B:
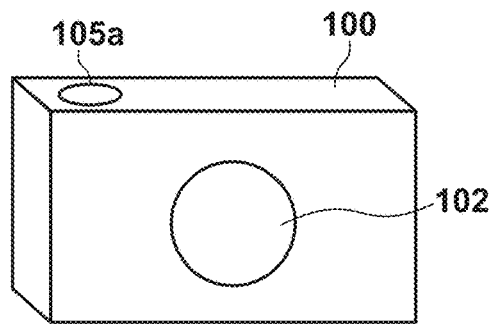
Figure 1C:
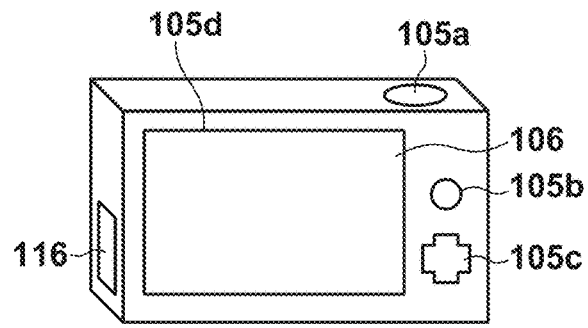

The appearance of the digital camera 100 will be described next. FIGS. 1B and 1C are diagrams illustrating an example of the appearance of the digital camera 100. A release switch 105a, a playback button 105b, a directional key 105c, and the touch panel 105d are operation members included in the operation unit 105 described above. Images obtained through the capturing by the image capturing unit 102 are also displayed in the display unit 106. The digital camera 100 according to the present embodiment also includes an antenna part of a power supply unit 116 on a side surface of the camera housing. Power can be supplied by bringing power supply units 116 to within a certain distance from each other. Non-contact power supply, which does not require a cable or the like, can be performed, and the supply of power can be controlled to start and end, as a result.

Although the following descriptions may refer to the digital camera 100 as being the entity performing the processing, it is actually the control unit 101 of the digital camera 100 that loads programs stored in the non-volatile memory 103 and implements the various types of processing.

The foregoing has described the digital camera 100.

Configuration of Control Apparatus 200

Figure 2:
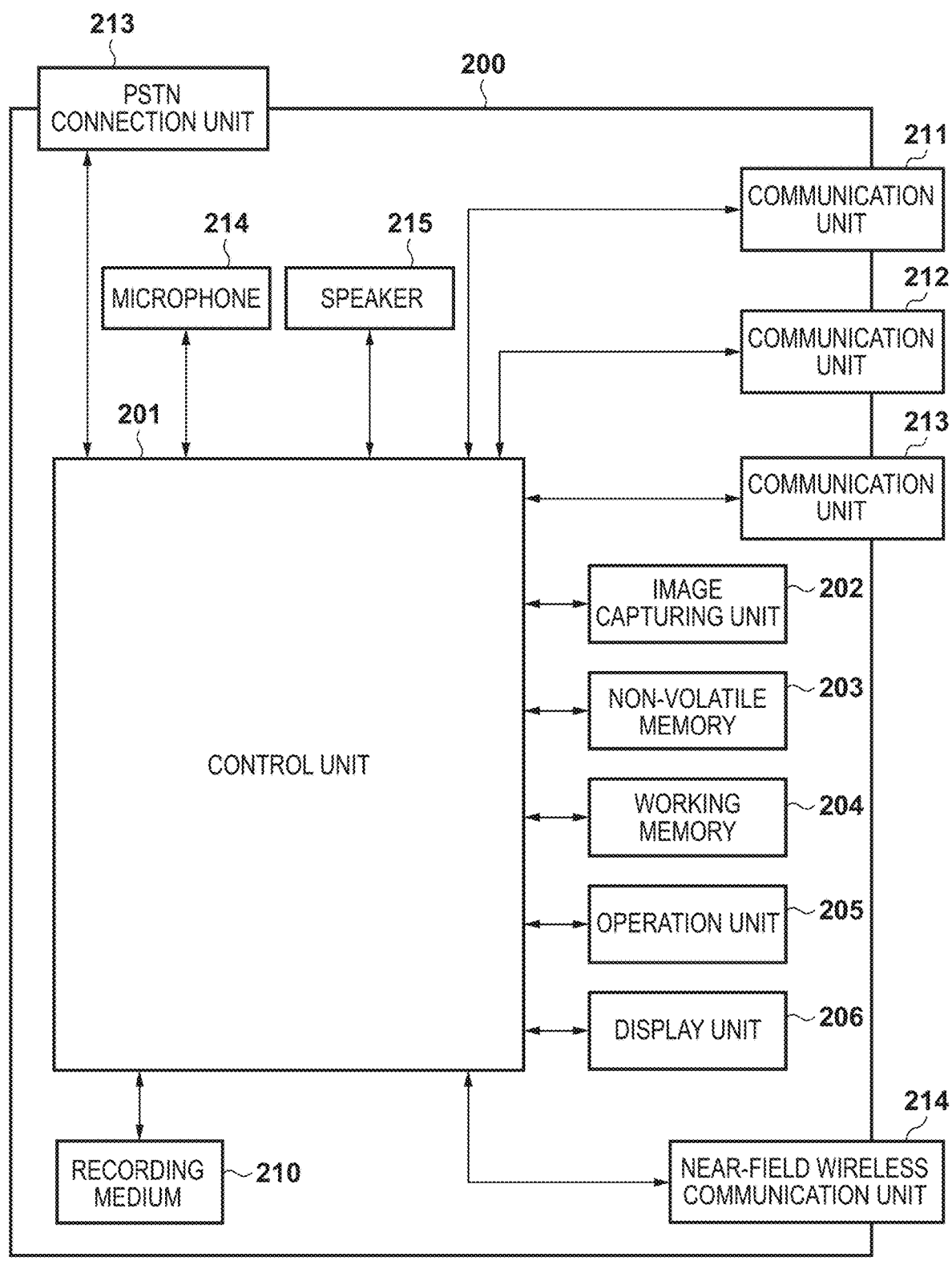
FIG. 2 is a hardware configuration diagram illustrating the configuration of a control apparatus.

FIG. 2 is a hardware configuration diagram illustrating an example of the configuration of the control apparatus 200 serving as an example of an information processing apparatus according to the present embodiment. A case where the control apparatus 200 is used as an example of a control apparatus included in the camera control system will be described here, but the control apparatus is not limited thereto. The control apparatus may be a digital camera having wireless functionality, a tablet device, a personal computer, or the like, for example.

In the control apparatus 200, a control unit 201 controls the various parts of the control apparatus 200 in accordance with input signals, programs (described later), and the like. Note that a plurality of pieces of hardware may control the overall apparatus by sharing processing rather than the control unit 201 controlling the overall apparatus.

A non-volatile memory 203 is a non-volatile memory that can be electrically erased and recorded to. An operating system (OS), which is basic software executed by the control unit 201, applications that implement practical functions by operating cooperatively with the OS, and the like are recorded in the non-volatile memory 203. Additionally, in the present embodiment, an application ("app" hereinafter) for communicating with the digital camera 100, for example, is stored in the non-volatile memory 203.

A working memory 204 is used as an image display memory for a display unit 206, a work region for the control unit 201, and the like.

An operation unit 205 is used for accepting instructions made to in the control apparatus 200 by a user. The operation unit 205 includes operation members such as, for example, a power button through which the user instructs the power of the control apparatus 200 to be turned on and off, an operation member for setting an RTC 207, a touch panel 206d disposed on the display unit 206, and the like.

The display unit 206 displays image data, a text display for interactive operations, and the like. Note that the control apparatus 200 does not absolutely need to include the display unit 206. It is sufficient for the control apparatus 200 to be capable of connecting to the display unit 206 and have at least a display control function for controlling the display in the display unit 206.

The RTC 207 manages a clock. The time is managed based on time settings input by a user through the operation unit 205, time information obtained through a communication unit 212 or a PSTN connection unit 213, time information obtained by a radio wave clock, and or the like. Any method can be used to input the time as long as the time can be managed. The time may also be obtained by a detection mechanism from a mechanical mechanism such as an analog clock. In this case, the RTC 207 is assumed to include the detection mechanism for detection from the analog clock.

A recording medium 210 can record image data transferred from the digital camera 100 to the control unit 201 through a communication unit 211. The recording medium 210 may be configured to be removable from the control apparatus 200, or may be built into the control apparatus 200. In other words, it is sufficient for the control apparatus 200 to at least have means for accessing the recording medium 210.

The communication unit 211 is an interface for connecting to an external device. The control apparatus 200 of the present embodiment can exchange data with the external device through the communication unit 211. In the present embodiment, the communication unit 211 is an antenna, and the control unit 201 can connect to the digital camera 100 via the antenna. In the present embodiment, the communication unit 211 includes an interface for communicating with an external device through what is known as "wireless LAN", based on the IEEE 802.11 standard. The control unit 201 implements wireless communication with the external device by controlling the communication unit 211. Note that the communication method is not limited to wireless LAN, and includes an infrared communication method as well, for example.

The communication unit 212 is an interface for connecting to an external device. The control apparatus 200 of the present embodiment can exchange data with the external device through the communication unit 212. The control apparatus 200 can receive image data generated by the digital camera 100 through the communication unit 212, for example. In the present embodiment, the communication unit 212 includes an interface for communicating with an external device through what is known as "Bluetooth" (registered trademark), based on the IEEE 802.15.1 standard. The control unit 201 implements wireless communication with the external device by controlling the communication unit 212. Note that the communication method is not limited to Bluetooth, and includes wireless LAN known from the IEEE 802.11 standard or an infrared communication method as well, for example.

A communication unit 213 is an interface for connecting to an external device. The control apparatus 200 of the present embodiment can exchange data with the external device through the communication unit 213. The control apparatus 200 can receive image data generated by the digital camera 100 through the communication unit 213, for example. In the present embodiment, the communication unit 213 includes an interface for communicating with an external device through wired LAN (Ethernet), based on the IEEE 802.3 standard. The control unit 201 implements communication with the external device by controlling the communication unit 213. Note that the communication method is not limited to wired LAN, and includes a USB communication method as well, for example.

Note that the communication unit 212 of the control apparatus 200 according to the present embodiment has a "peripheral mode" and a "central mode" as operating modes. By operating the communication unit 212 in the central mode, the control apparatus 200 according to the present embodiment can operate as a server device according to Bluetooth. When the control apparatus 200 operates as a server device, communication can be performed by connecting to an external device that is set to the peripheral mode. To authenticate the external device which is connected to, unique information of the external device being connected to is stored in the non-volatile memory 203 by performing pairing in advance.

The near-field wireless communication unit 214 is constituted by, for example, an antenna for wireless communication, a modulation/demodulation circuit and a communication controller for processing wireless signals, and the like. The near-field wireless communication unit 214 outputs modulated wireless signals from the antenna and demodulates wireless signals received from the antenna to implement non-contact near field communication according to the ISO/IEC 18092 standard (known as "Near Field Communication" (NFC)). The near-field wireless communication unit 214 according to the present embodiment is disposed on a side part of the control apparatus 200.

Although the following descriptions may refer to the control apparatus 200 as being the entity performing the processing, it is actually the control unit 201 of the control apparatus 200 that loads the programs of apps (or the functions of the apps, an OS, services of the OS, or the like) loaded into the working memory 204, and implements various types of processing.

System Configuration

The configuration of the camera control system according to the present embodiment will be described next.

Figure 3:
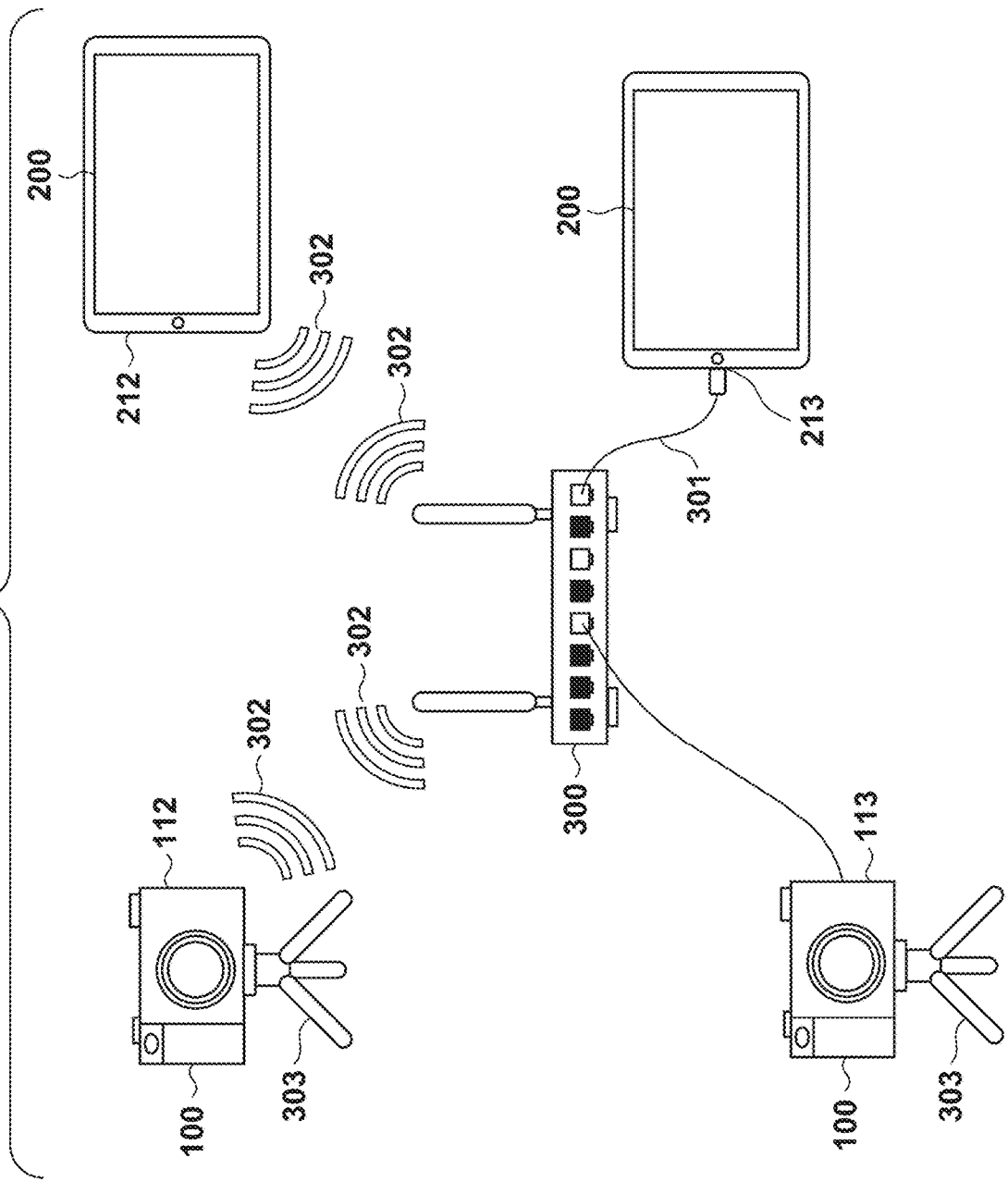
FIG. 3 is a diagram illustrating the configuration of a camera control system.

FIG. 3 is a diagram illustrating the configuration of a system in which a plurality of the control apparatuses 200 and a plurality of the digital cameras 100 are connected through a network device 300, and the digital cameras 100 can be controlled remotely by the control apparatuses 200.

Each digital camera 100 is mounted on a tripod 303 or the like, and is installed in a corresponding shooting position. Although the present embodiment describes an installation method in which the digital camera 100 is installed on the tripod 303, the digital camera 100 may instead be installed on a remote gimbal through which pan, tilt, and zoom operations can be controlled remotely.

The following can be considered as examples of connection modes for the communication between the digital camera 100 and the control apparatus 200. One mode is the digital camera 100 connecting to the network device 300 through wireless communication over radio waves 302 through the communication unit 112, and communicating with the control apparatus 200. Another mode is the digital camera 100 connecting to the network device 300 over a wired LAN through the communication unit 113, and communicating with the control apparatus 200.

Yet another mode is the control apparatus 200 connecting to the network device 300 through wireless communication over radio waves 302 through the communication unit 212, and communicating with the digital camera 100. Still another mode is the control apparatus 200 connecting to the network device 300 over a wired LAN through the communication unit 213, and communicating with the digital camera 100.

Although the present embodiment describes an example of communicating through the network device 300, the digital camera 100 and the control apparatus 200 may be connected directly.

As illustrated in FIG. 3, in a state where the plurality of digital cameras 100 and control apparatuses 200 that are installed can communicate, the control apparatuses 200 can issue commands to the individual digital cameras 100 to obtain setting information of the digital cameras 100, and commands for changing the settings.

Additionally, the control apparatus 200 can send a shooting start command, which is a command for requesting shooting operations to start, and a shooting stop command, which is a command for requesting shooting operations to stop, to the individual digital cameras 100. The timings at which to start and stop the shooting operations by the digital cameras 100 can be specified using these commands.

Furthermore, the control apparatus 200 can send an autofocus start command, which is a command for requesting the start of autofocus operations, and an autofocus stop command, which is a command for requesting the stop of the autofocus operations, to the individual digital cameras 100. The timings at which to start and stop the autofocus operations by the digital cameras 100 can be instructed using these commands. Hereinafter, the shooting start command and the shooting stop command will be collectively called "shooting control commands", and the autofocus start command and the autofocus stop command will be called "autofocus control commands".

The digital camera 100 not only starts shooting operations in response to a shooting operation start command output from the control unit 101 when the release switch enters the SW2 state, but also starts shooting operations in response to shooting start commands received from the control apparatus 200.

Likewise, not only does the autofocus operation start in response to the autofocus operation start command output from the control unit 101 when the AF-ON button is pressed, but the autofocus operation also starts in response to the autofocus start command received from the control apparatus 200.

Such a configuration makes it possible to control the shooting and autofocus by the digital camera 100 from the control apparatus 200.

System Issues

However, when, in the system according to the present embodiment, a plurality of the control apparatuses 200 communicate with the same digital camera 100 and perform autofocus or shooting control within the same period, there is an issue in that the operations will conflict.

For example, the following problem occurs when there is a limitation in which when a digital camera 100 is already performing shooting operations in response to a shooting start command from a given control apparatus 200, the digital camera 100 does not accept shooting start commands from other control apparatuses 200. That is, when a digital camera 100 is performing shooting operations in response to a shooting start command already sent from one photographer through a control apparatus 200, and another photographer sends a shooting start command to shoot a photograph from another control apparatus 200, the digital camera 100 will not accept that shooting start command. It is therefore necessary for the other photographer to send a start command from the control apparatus 200 again to cause the digital camera 100 to start shooting after the digital camera 100 has finished the first shooting operations. However, there is a risk that the other photographer will miss their chance for a shot during that period of time.

A similar issue arises with autofocus. For example, the following problem occurs in a system having a limitation in which when a digital 100 camera is already performing autofocus operations in response to an autofocus start command from one control apparatus 200, the digital camera 100 does not accept autofocus start commands from other control apparatuses 200. That is, when a digital camera 100 is performing autofocus operations in response to an autofocus start command already sent from one photographer through a control apparatus 200, and another photographer sends an autofocus start command to prepare to shoot a photograph from another control apparatus 200, the digital camera 100 will not accept that autofocus start command. It is therefore necessary for the other photographer to send a start command from the control apparatus 200 again to cause the digital camera 100 to start autofocus operations after the digital camera 100 has finished performing the first instance of autofocus operations. However, there is a risk that the other photographer will be late to prepare to take their shot, and miss their chance for the shot, during that period of time.

Method to Address the Issue

Accordingly, in the present embodiment, the following control is performed when a plurality of the control apparatuses 200 communicate with the same digital camera 100 and perform control related to autofocus or shooting operations within the same period. That is, when the digital camera 100 first receives a shooting start command from any one of the control apparatuses 200, the shooting operations are started, and the shooting operations continue until shooting stop commands are received from all the control apparatuses 200 that have sent start commands. Then, when shooting stop commands are received from all the control apparatuses 200 that sent shooting start commands, the shooting operations are stopped. Additionally, when an autofocus start command is first received from any one of the control apparatuses 200, the autofocus operations are started, and the autofocus operations continue until autofocus stop commands are received from all the control apparatuses 200 that have sent start commands. Then, when autofocus stop commands are received from all the control apparatuses 200 that have sent autofocus start commands, the autofocus operations are stopped.

Operations by the control apparatus 200 and the digital camera 100 according to the first embodiment will be described hereinafter.

Series of Operations by Control Apparatus 200

Figure 4A:
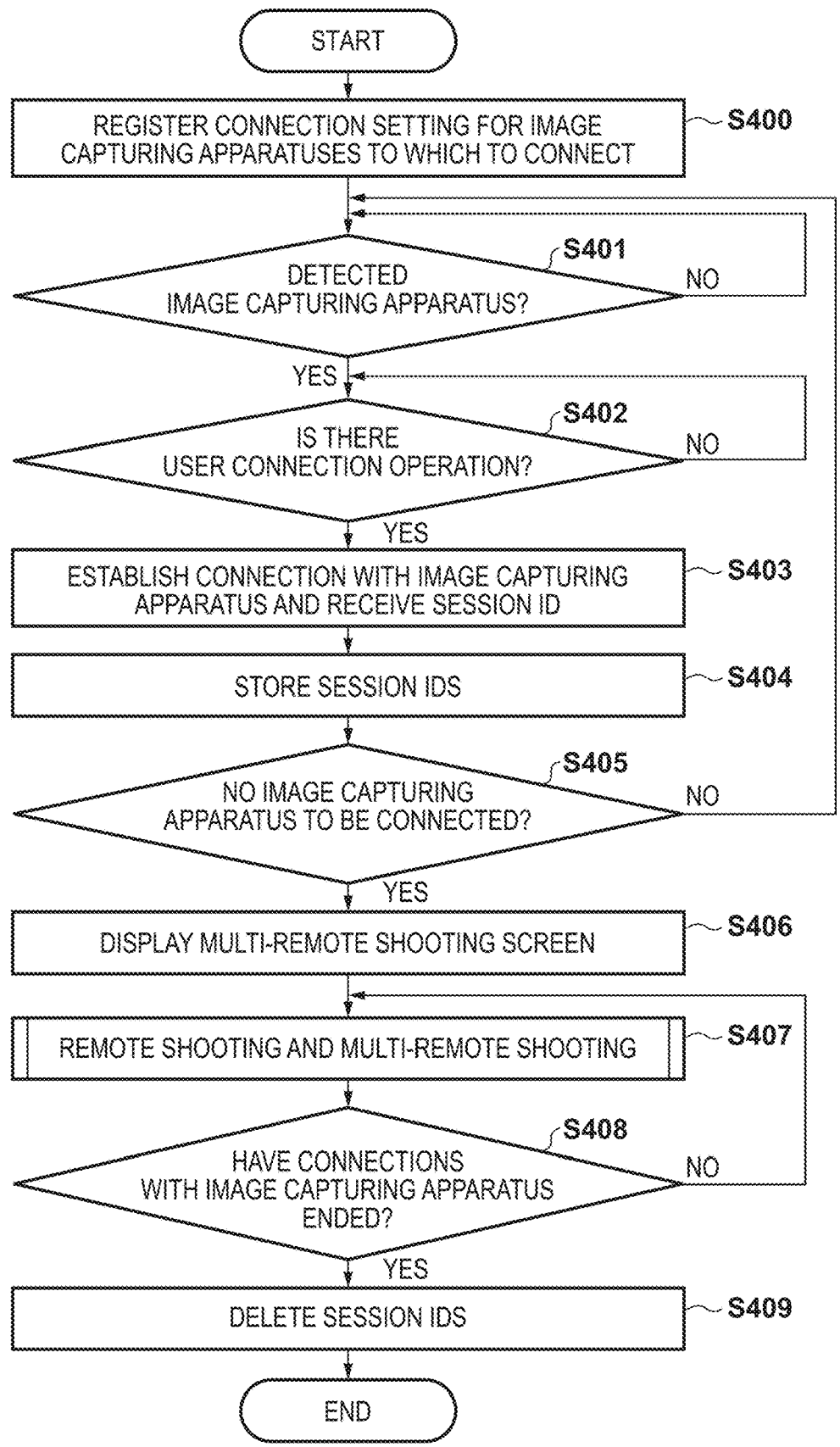
FIG. 4A is a flowchart illustrating an example of operations performed by the control apparatus according to a first embodiment.
Figure 4B:
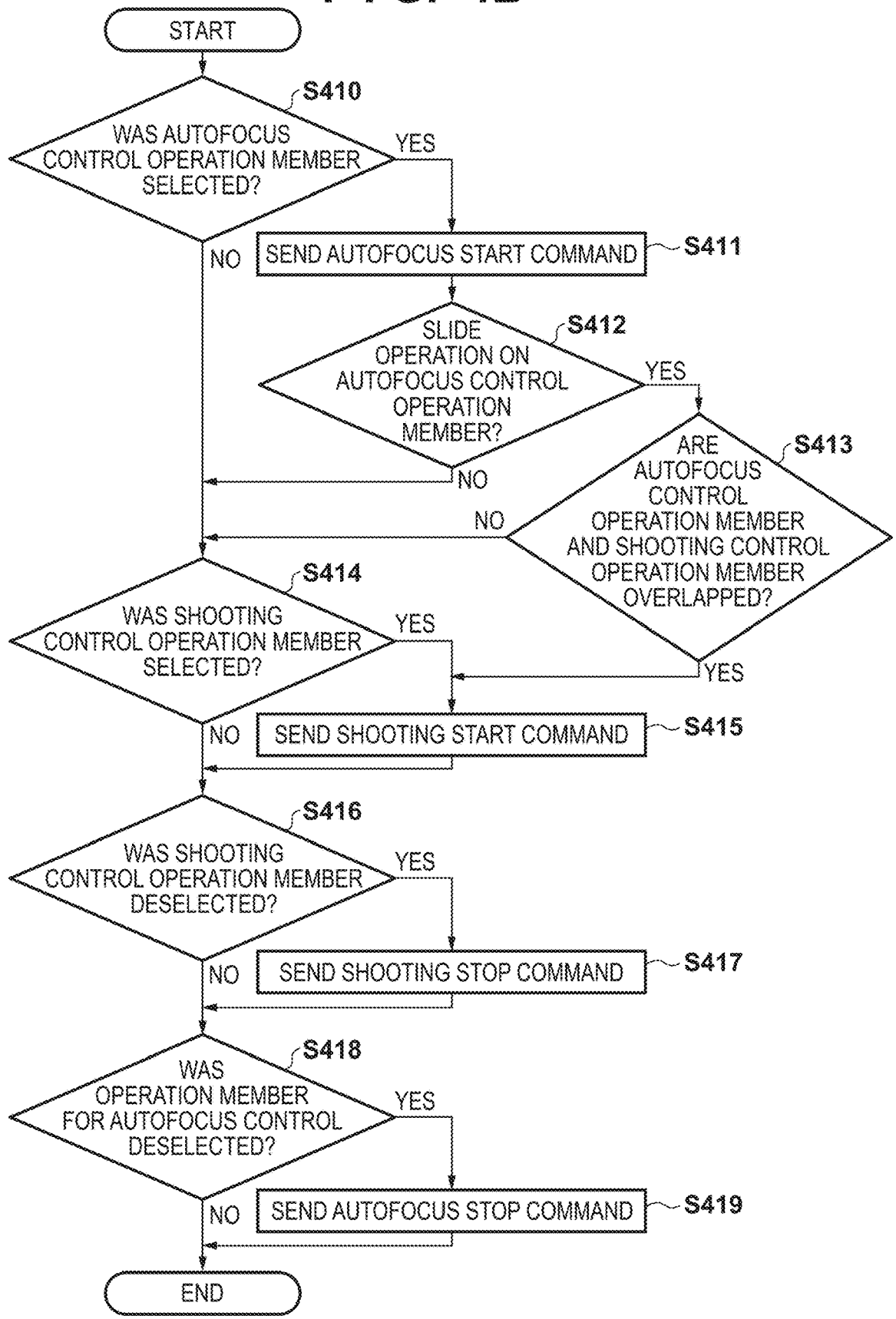
FIG. 4B is a flowchart illustrating an example of operations performed by the control apparatus according to the first embodiment.

FIGS. 4A and 4B are flowcharts illustrating operations performed by the control apparatus 200 according to the present embodiment. Hereinafter, a case where the control apparatus 200 performs shooting control by remotely operating a plurality of digital cameras 100 will be called "multi-remote shooting". On the other hand, a case where the control apparatus 200 performs shooting control by remotely operating an individual digital camera 100 will be called "remote shooting".

FIG. 4A is a flowchart illustrating a series of operations performed by the control apparatus 200 from establishing a connection with the plurality of digital cameras 100 to ending the processing. Note that the operations illustrated in FIG. 4A are implemented by the control unit 201 of the control apparatus 200 loading a control program stored in the non-volatile memory 203 into the working memory 204 and executing the program. This flowchart will describe the series of operations as being started when the control apparatus 200 is started up.

In step S400, the control unit 201 registers connection settings of the plurality of digital cameras 100 with which connections are to be established.

In step S401, the control unit 201 performs processing for detecting the digital camera 100, and determines whether the digital camera 100 has been detected. The control unit 201 moves the sequence to step S402 if the digital camera 100 has been detected, and repeats step S401 if not.

In step S402, the control unit 201 determines whether a connection operation has been performed by a user. The control unit 201 moves the sequence to step S403 if a connection request has been made, and repeats step S402 if not.

In step S403, the control unit 201 performs connection processing with the detected digital camera 100 to establish a connection with the digital camera 100. The control apparatus 200 also receives a session ID from the digital camera 100 when establishing the connection with the digital camera 100. The session ID is an ID for identifying a communication session, from the establishment to the end of the connection. The session ID is added to each command sent to the digital camera 100 by the control apparatus 200, and sent with that command, in remote shooting and multi-remote shooting performing in step S407 (described later). This makes it possible for the digital camera 100 to distinguish a command received from the control apparatus 200 from a command received from another control apparatus 200 or over another connection with the same control apparatus.

In step S404, the control apparatus 200 stores all the session IDs received in step S403 in the non-volatile memory 203, the working memory 204, or the recording medium 210.

In step S405, the control unit 201 determines whether there is a second or subsequent digital camera 100 to be connected, for which a connection was registered in step S400. If there is no digital camera 100 to be connected, the control unit 201 determines that remote shooting and multi-remote shooting can be started, after which the sequence moves to step S406. If a digital camera 100 to be connected remains, the sequence returns to step S401.

In step S406, the control unit 201 displays a multi-remote shooting screen in the display unit 206.

The multi-remote shooting screen will be described here with reference to FIGS. 5A to 5F.

Multi-Remote Shooting Control Screen

FIGS. 5A to 5F illustrate the configuration of a screen displayed by the control apparatus 200 when two digital cameras 100 are connected to the control apparatus 200 and multi-remote shooting is performed.

Figure 5A:
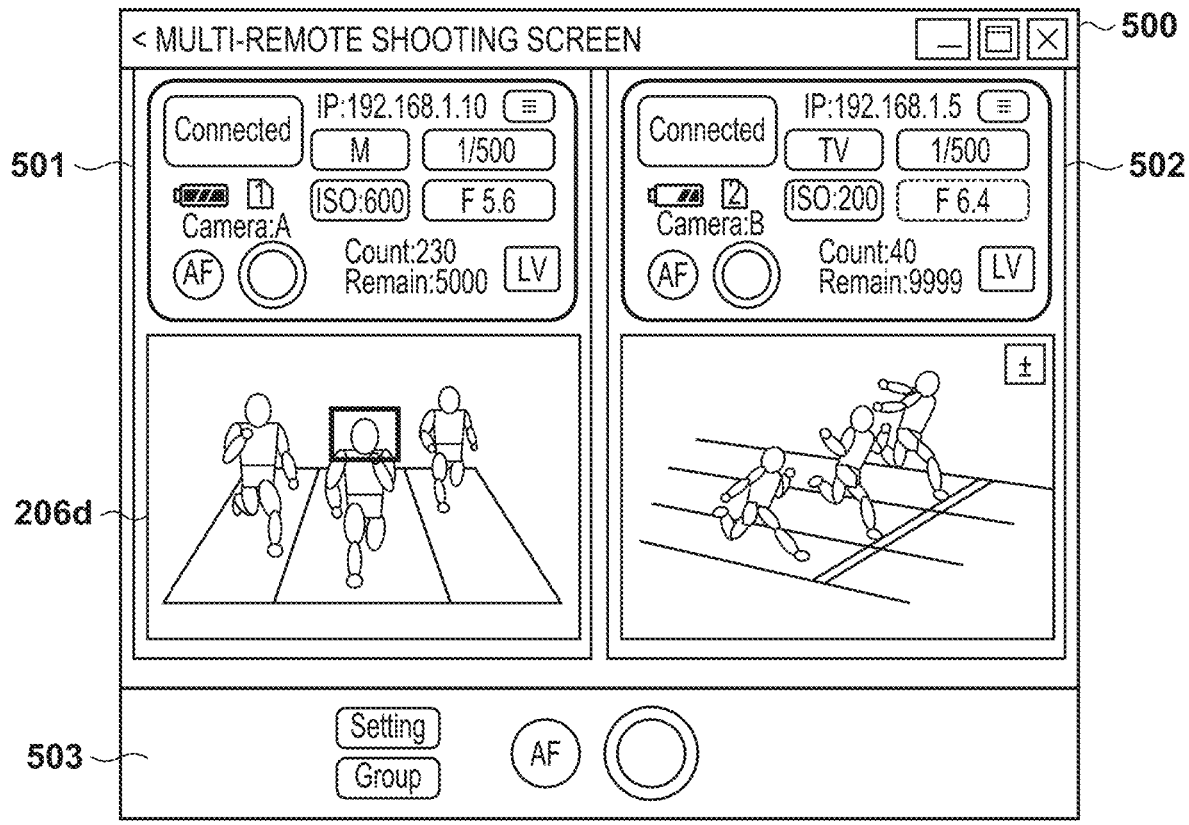
FIGS. 5A to 5F are diagrams illustrating examples of a display screens of the control apparatus according to the first embodiment.

FIG. 5A illustrates a multi-remote shooting screen 500. The multi-remote shooting screen 500 includes an individual camera control section 501 for controlling shooting-related settings, focus, shooting, and the like, for the first digital camera 100 connected to the control apparatus 200.

Also included is an individual camera control section 502 for controlling shooting-related settings, focus, shooting, and the like, for the second digital camera 100 connected to the control apparatus 200. Further included is a multi-camera control section 503 for controlling a plurality of the digital cameras 100 at once. Note that hereinafter, controlling a plurality of cameras will be called "multi-camera control".

The individual camera control sections 501 and 502 have the same functions. Furthermore, when the connection settings for third and subsequent digital cameras 100 are registered in the control apparatus 200, an individual camera control section for the third and subsequent digital cameras 100 are added to the multi-remote shooting screen 500.

Note that the individual camera control section 501, the other individual camera control section 502, the multi-camera control section 503, and the like are implemented by the functions of the touch panel 206d.

Configuration of Individual Camera Control Section

Figure 5B:
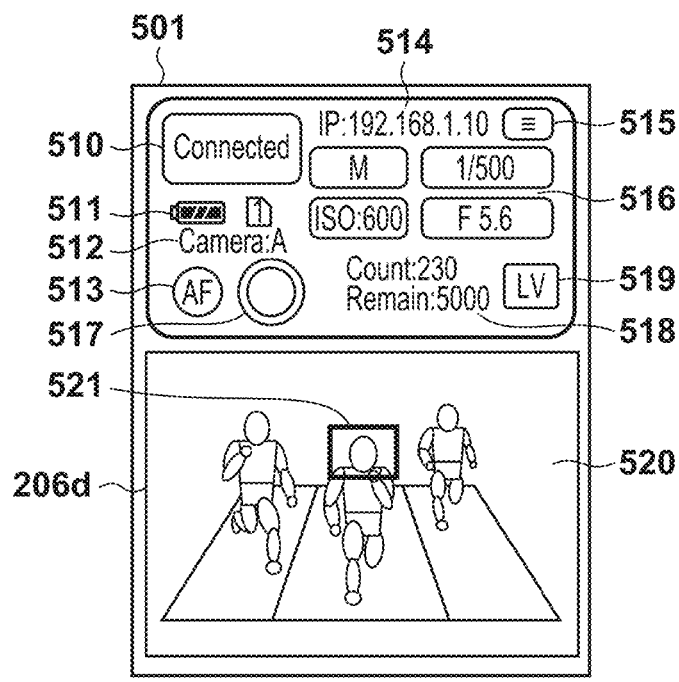

FIG. 5B is a diagram illustrating the configuration of the individual camera control section 501.

The individual camera control section 501 includes an operation member 510 for controlling the connection state with the digital camera 100, a display member 511 for displaying the power state of the digital camera 100, the status of a recording member, and the like, and a name display member 512 for identifying the individual camera. Also included are an operation member 513 for controlling the autofocus of the individual digital camera 100, a display member 514 for indicating the network address of the digital camera 100, and a setting member 515 for performing various settings for individual camera control. Also included are a member group 516 that control the display and changing of shooting settings of the digital camera 100, an operation member 517 that performs remote shooting for the individual digital camera 100, and a display member 518 that indicates a number of shots taken, and a remaining number of shots that can be taken, by the digital camera 100. Further included are a member 519 that controls a live view display in the digital camera 100, a display operation member 520 for remote live view, and a display member 521 that indicates the focus detection region (called an "AF frame" hereinafter) during autofocus in the digital camera 100.

In the individual camera control section 501 illustrated in FIG. 5B, the user performs autofocus control for focusing on a subject using the operation member 513, and performs remote shooting control using the operation member 517. Upon detecting that the user has touched the operation member 517 with a finger, the control apparatus 200 sends a shooting start command to the digital camera 100. Then, upon detecting that contact is no longer being made with the operation member 517, a shooting stop command is sent to the digital camera 100. Additionally, upon detecting that the position of the operation member 513 has been touched, an autofocus start command is sent to the digital camera 100, and upon detecting that contact is no longer being made with the operation member 513, an autofocus stop command is sent to the digital camera 100.

Figure 5C:
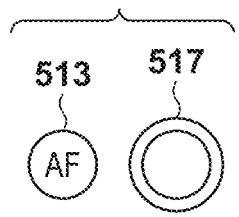
Figure 5D:
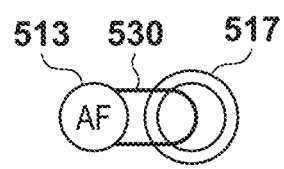
Figure 5E:
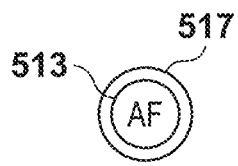

As illustrated in FIG. 5C, the operation member 513 is disposed in a position separated from the operation member 517. However, the operation member 513 is configured to be movable in the direction of the operation member 517 by the user touching and sliding the operation member 513. Accordingly, if the control apparatus 200 detects that the operation member 513 has been touched and the touched position has been moved, the control apparatus 200 changes the display position of the operation member 513 in response to the movement of the touched position. At this time, a clear indication that the operation member 513 can slide may be indicated by displaying a guideline 530 indicating the sliding direction of the operation member 513, as illustrated in FIG. 5D. Then, when the position of the operation member 513 is detected to have been moved by a touch-slide operation made by the user, and overlaps the operation member 517, the control apparatus 200 sends a shooting start command to the digital camera 100, as illustrated in FIG. 5E. Here, if, after the operation member 513 overlaps the operation member 517, the operation member 513 is moved in a direction different from the direction in which the operation member 513 can slide, and moves away from the operation member 517, the control unit 201 sends a shooting stop command to the digital camera 100.

Note that the form of the operation members for autofocus control and remote shooting control in the remote shooting described above is merely one example, and can be modified or changed as appropriate.

Configuration of Multi-Camera Control Section

Figure 5F:
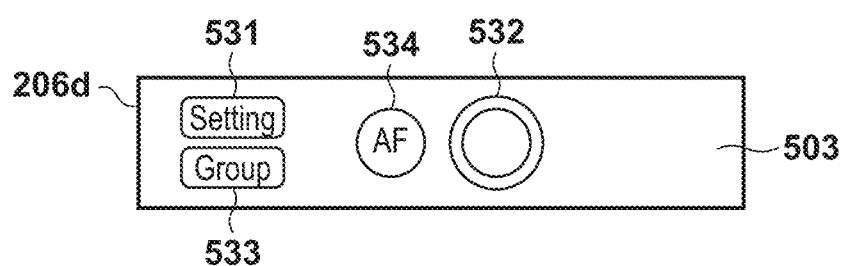

FIG. 5F illustrates the configuration of the multi-camera control section 503.

The multi-camera control section 503 is constituted by members that output commands to the plurality of digital cameras 100 at once. Specifically, the multi-camera control section 503 includes an operation member 531 that sets shooting parameters at once, an operation member 532 that instructs multi-remote shooting, and an operation member 533 that selects a group when instructing multi-remote shooting. Further included is an operation member 534 for instructing the plurality of digital cameras 100 to perform autofocus at once.

The operation member 534 can perform the same operations as the operation member 513 in the individual camera control section 501, and issues autofocus start commands and autofocus stop commands to the plurality of digital cameras 100.

Additionally, the operation member 532 can perform the same displays and operations as the operation member 517 in the individual camera control section 501, and issues shooting start commands and shooting stop commands to the plurality of digital cameras 100.

Note that the form of the operation members the for autofocus control and multi-remote shooting control in the multi-remote shooting described above is merely one example, and can be modified or changed as appropriate.

The foregoing has described the multi-remote shooting control screens.

Returning to the descriptions of FIG. 4A, in step S407, the control unit 201 performs remote shooting processing and multi-remote shooting processing illustrated in FIG. 4B. FIG. 4B will be described later.

In step S408, the control unit 201 determines whether the connections with the plurality of digital cameras 100 have ended. If the connections have ended, the control unit 201 determines that the user has completed the remote shooting processing and the multi-remote shooting processing, and the sequence moves to step S409. If the processing is not complete, the sequence returns to step S407.

In step S409, the control unit 201 deletes the session IDs for the plurality of digital cameras 100 whose connections have ended from the non-volatile memory 203, the working memory 204, or the recording medium 210, and ends the series of operations in the flowchart.

FIG. 4B is a flowchart illustrating a series of operations in the remote shooting processing and the multi-remote shooting processing performed by the control unit 201 for the plurality of digital cameras 100, performed in step S407 of FIG. 4A.

Note that the operations illustrated in FIG. 4B are implemented by the control unit 201 of the control apparatus 200 loading a control program stored in the non-volatile memory 203 into the working memory 204 and executing the program. This flowchart will describe the series of operations as being started when the control apparatus 200 displays the multi-remote shooting screen.

Additionally, in the descriptions of FIG. 4B, the operation member 513 in the individual camera control section 501 and the operation member 534 in the multi-camera control section 503 will be collectively referred to as "autofocus control operation members". Additionally, the operation member 517 in the individual camera control section 501 and the operation member 532 that issues shooting commands in the multi-camera control section 503 will be collectively referred to as "shooting control operation members".

In step S410, the control unit 201 determines whether the autofocus control operation member 513 or 534 has been selected by the user. The control unit 201 moves the sequence to step S411 if such a selection has been detected, and moves the sequence to step S414 if not.

In step S411, the control unit 201 transmits an autofocus start command to the digital camera 100, among the digital cameras 100 for which connections have been established in step S403, that corresponds to the autofocus control operation member selected in step S410. In other words, if the operation member 513 is selected in step S410, an autofocus start command is sent to the individual digital camera 100. However, if the operation member 534 is selected in step S410, an autofocus start command is sent to a plurality of cameras belonging to a group that is the subject of the shooting. The control unit 201 also reads out the session IDs identifying the connections with the respective digital cameras 100 from the non-volatile memory 203, the working memory 204, or the recording medium 210, and sends the session IDs along with the autofocus start commands.

In step S412, the control unit 201 determines whether an operation for sliding the autofocus control operation member in the selected state has been made. The control unit 201 moves the sequence to step S413 if the sliding operation has been made, and moves the sequence to step S414 if not.

In step S413, the control unit 201 determines whether a slide operation has been performed until the autofocus control operation member and the shooting control operation member overlap, and whether the autofocus control operation member overlaps with the shooting control operation member. The control unit 201 moves the sequence to step S415 if the operation members overlap, and moves the sequence to step S414 if not.

In step S414, the control unit 201 determines whether a shooting control operation member has been selected. The control unit 201 moves the sequence to step S415 if the operation member has been selected, and moves the sequence to step S416 if not.

In step S415, the control unit 201 sends a shooting start command to the digital camera 100, among the digital cameras 100 for which connections have been established in step S403, that corresponds to the shooting control operation member selected in step S413 or step S414. In other words, if the operation member 517 has been selected, a shooting start command is sent to the individual digital camera 100, and if the operation member 532 has been selected, shooting start commands are sent to a plurality of digital cameras 100 belonging to a group that is the subject of the shooting. The control unit 201 also reads out the session IDs identifying the connections with the respective digital cameras 100 from the non-volatile memory 203, the working memory 204, or the recording medium 210, and sends the session IDs along with the shooting start commands.

In step S416, the control unit 201 determines whether the shooting control operation member has been deselected. The control unit 201 moves the sequence to step S417 if the member has been deselected, and moves the sequence to step S418 if not.

In step S417, the control unit 201 sends a shooting stop command to the digital camera 100, among the digital cameras 100 for which connections have been established in step S403, that corresponds to the shooting control operation member that was deselected in step S416. The control unit 201 also reads out the session IDs identifying the connections with the respective digital cameras 100 from the non-volatile memory 203, the working memory 204, or the recording medium 210, and sends the session IDs along with the shooting stop commands.

In step S418, the control unit 201 determines whether the autofocus control operation member has been deselected. If the member has been deselected, the control unit 201 moves the sequence to step S419, whereas if the member has not been deselected, the control unit 201 ends the remote shooting and multi-remote shooting operations in this flowchart.

In step S419, the control unit 201 sends an autofocus control stop command to the digital camera 100, among the digital cameras 100 for which connections have been established in step S403, that corresponds to the autofocus control operation member that was deselected in step S418. The control unit 201 also reads out the session IDs identifying the connections with the respective digital cameras 100 from the non-volatile memory 203, the working memory 204, or the recording medium 210, and sends the session IDs along with the autofocus stop commands. The remote shooting and multi-remote shooting operations in this flowchart then end.

The foregoing has described processing by which the control apparatus 200 establishes a connection with the plurality of digital cameras 100, performs remote shooting and multi-remote shooting, and ends the shooting.

Series of Operations by Digital Camera 100

Figure 6A:
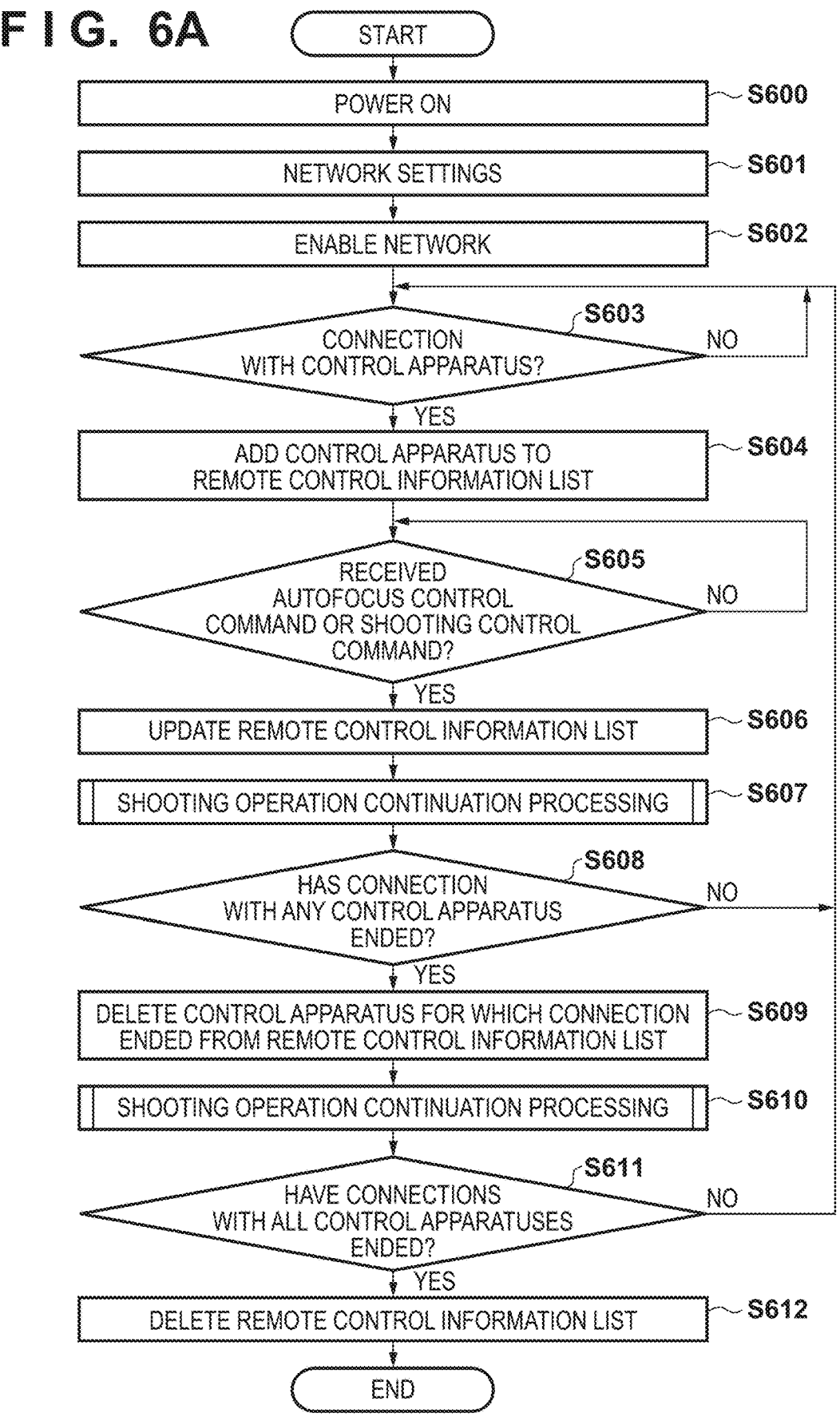
FIG. 6A is a flowchart illustrating operations performed by the digital camera according to the first embodiment.
Figure 6B:
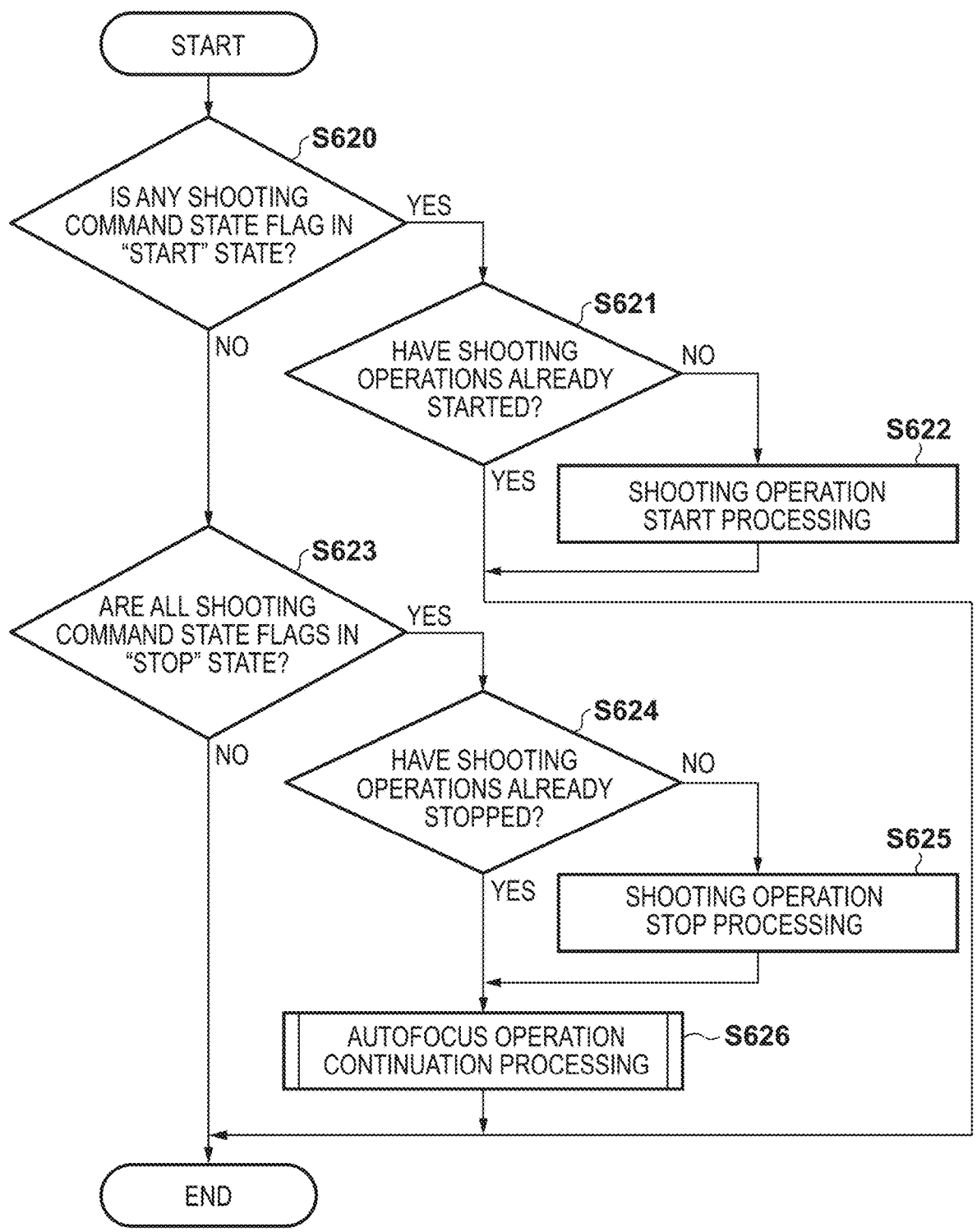
FIG. 6B is a flowchart illustrating operations performed by the digital camera according to the first embodiment.
Figure 6C:
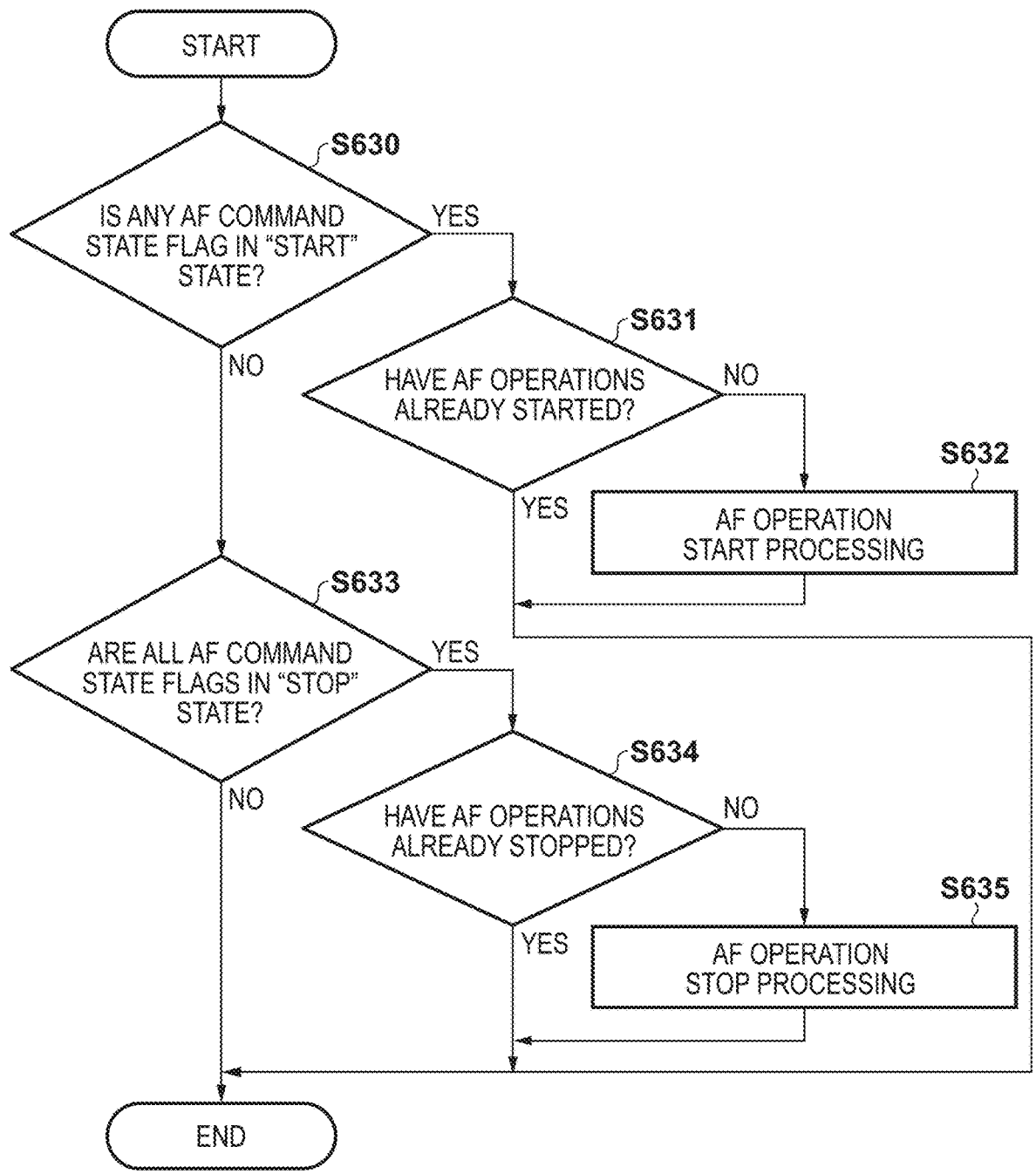
FIG. 6C is a flowchart illustrating operations performed by the digital camera according to the first embodiment.

FIGS. 6A to 6C are flowcharts illustrating operations performed by the digital camera 100 according to the present embodiment. Processing in which the digital camera 100 receives commands from a plurality of control apparatuses 200 and performs autofocus and shooting is performed in accordance with this processing flow.

FIG. 6A is a flowchart illustrating a series of operations performed by the digital camera 100 from establishing a connection with the control apparatus 200 to ending the processing. Note that the operations illustrated in FIG. 6A are implemented by the control unit 101 of the digital camera 100 loading a control program stored in the non-volatile memory 103 into the working memory 104 and executing the program. This flowchart will describe the series of operations as being started when the digital camera 100 is placed at a shooting position.

In step S600, when the user turns on the power of the digital camera 100, the control unit 101 moves the sequence to step S601.

In step S601, the control unit 101 makes network settings for connecting to the control apparatus 200.

In step S602, the control unit 101 applies the network settings to enter a state in which the control apparatus 200 can be connected to.

In step S603, the control unit 101 determines whether a connection request has been made from the control apparatus 200. If a connection request has been made, the control unit 101 performs connection processing to establish a connection with the control apparatus 200.

When establishing a connection with the control apparatus 200, the control unit 101 generates a session ID for identifying the communication session to be started with the control apparatus 200 and sends the session ID to the control apparatus 200. Although random numbers or random character strings based on the current time or the like are used for the session IDs generated by the control unit 101, the method for generating the session IDs and the format thereof are not particularly limited. Then, whether a connection has been established with at least one control apparatus 200 is determined. If a connection has not been established, step S603 is repeated, and the connection request from the control apparatus 200 is confirmed. The control unit 101 moves the sequence to step S604 if a connection has been established with at least one control apparatus.

In step S604, the control unit 101 determines whether a list that holds, in association with each other, (i) the session ID sent to the control apparatus 200 with which a connection was established in step S603, and (ii) the latest states (details) of the autofocus control command and the shooting control command received from the control apparatus 200 (a source) in the processing of step S605 (described later) (this list will be called a "remote control information list" hereinafter), has already been generated. If not, the control unit 101 generates the remote control information list and stores the list in the non-volatile memory 203, the working memory 204, or the recording medium 210.

The remote control information list will be described with reference to FIG. 7.

FIG. 7 is a diagram illustrating an example of the remote control information list. The remote control information list is constituted by a session ID 701, an autofocus command state flag 702, and a shooting command state flag 703.

The session ID 701 is generated when the digital camera 100 establishes a connection with the control apparatus 200 in step S603. The session ID is an ID unique to the communication session, and is received from the control apparatus 200 along with the command when the digital camera 100 receives the command from the control apparatus 200.

The autofocus command state flag 702 is a variable indicating whether the latest autofocus control command received from each control apparatus 200 was an autofocus start command ("start") or an autofocus stop command ("stop").

The shooting command state flag 703 is a variable indicating whether the latest shooting control command received from each control apparatus 200 was a shooting start command ("start") or a shooting stop command ("stop").

The remote control information list is expressed as a combination of the session ID 701, the autofocus command state flag 702, and the shooting command state flag 703. In FIG. 7, for example, the latest autofocus control command received from the control apparatus 200, for which the session ID is 0×41, is an autofocus start command, and the latest shooting control command received from the control apparatus 200 is a shooting stop command.

The foregoing has described the remote control information list.

Returning to the descriptions of FIG. 6A, in step S604, the following processing is carried out in addition to the processing described above. That is, the control unit 101 sets the autofocus command state flag and the shooting command state flag corresponding to the session ID sent to each control apparatus 200 in step S603 to an initial value of "stop", and adds those items to the remote control information list.

In step S605, the control unit 101 determines whether an autofocus control command or a shooting control command has been received from the control apparatus 200. The control unit 101 moves the sequence to step S606 if a command has been received, and repeats step S605 if not.

In step S606, the control unit 101 updates the remote control information list based on the autofocus control command or the shooting control command received from the control apparatus 200 in step S605 and the session ID received with the command.

If an autofocus start command has been received from the control apparatus 200 in step S605, the autofocus command state flag corresponding to the session ID received with the command is updated to "start", and if an autofocus stop command has been received, the flag is updated to "stop". If a shooting start command has been received from the control apparatus 200 in step S605, the shooting command state flag corresponding to the session ID received with the command is updated to "start", and if a shooting stop command has been received, the flag is updated to "stop".

In step S607, the control unit 101 performs shooting operation continuation processing, illustrated in FIG. 6B. FIG. 6B will be described later.

In step S608, the control unit 101 determines whether the connection with any of the control apparatuses 200 with which connections were established in step S603 has ended. The control unit 101 moves the sequence to step S609 if the connection has ended, and to step S603 if not.

In step S609, the control unit 101 deletes the control apparatus 200 for which the connection ended in step S608 from the remote control information list. Note that instead of deleting the control apparatus 200 from the remote control information list, the autofocus command state flag and the shooting command state flag in the remote control information list corresponding to the control apparatus 200 for which the connection ended in step S608 may be set to "stop". Then, the remote control information list may be managed without being deleted, until the list is deleted in step S612 (described later).

In step S610, the control unit 101 performs the shooting operation continuation processing, illustrated in FIG. 6B, in the same manner as in step S607.

This is done to re-determine whether to continue the autofocus operations and the shooting operations of the digital camera 100 in response to the remote control information list being updated in step S609, and to update the states of the autofocus operations and the shooting operations. For example, if the control apparatus 200 for which the shooting command state flag was "start" is deleted in step S609, it is possible that the shooting operations will continue after the control apparatus 200 has been disconnected even though all the shooting command state flags in the remote control information list are set to "stop". As such, after the remote control information list is updated, it is necessary to perform the shooting operation continuation processing based on the updated remote control information list.

In step S611, the control unit 101 determines whether the connections with all the control apparatuses 200 with which connections were established in step S603 have ended. The control unit 101 moves the sequence to step S612 if the connections have ended, and to step S603 if not.

In step S612, the control unit 101 deletes the entire remote control information list from the non-volatile memory 203, the working memory 204, or the recording medium 210, and ends the operations of the flowchart.

FIG. 6B is a flowchart illustrating operations in the shooting operation continuation processing performed by the control unit 101 in steps S607 and S610 of FIG. 6A.

In step S620, the control unit 101 refers to the shooting command state flag in all session IDs in the remote control information list, and determines whether any shooting command state flag is set to "start". The control unit 101 moves the sequence to step S621 if any shooting command state flag is set to "start", and to step S623 if all of the shooting command state flags are not set to "start".

In step S621, the control unit 101 determines whether shooting operations have already been started in the digital camera 100. The control unit 101 ends the shooting operation continuation processing of this flowchart if the shooting operations have already been started, and moves the sequence to step S622 if the shooting operations have not been started.

In step S622, the control unit 101 performs shooting operation start processing, which starts shooting operations for a still image, and then ends the shooting operation continuation processing of this flowchart. However, if the continuous shooting mode is set, the shooting operations are performed repeatedly from the start to the stop. In other words, shots are taken continuously, and a plurality of images are shot in sequence, until shooting operation stop processing is performed in step S625 (described later).

In step S623, the control unit 101 refers to the shooting command state flag in all session IDs in the remote control information list, and determines whether all the shooting command state flags are set to "stop". The control unit 101 moves the sequence to step S624 if all shooting command state flags are set to "stop", and ends the shooting operation continuation processing of this flowchart if any shooting command state flag is not set to "stop".

In step S624, the control unit 101 determines whether shooting operations have already been stopped in the digital camera 100. The control unit 101 moves the sequence to step S626 if the shooting operations have already been stopped, and moves the sequence to step S625 if the shooting operations have not been stopped, i.e., if the shooting operations have already been started.

In step S625, the control unit 101 performs the shooting operation stop processing, which stops the shooting operations for a still image.

In step S626, the control unit 101 performs autofocus operation continuation processing, illustrated in FIG. 6C, after which the shooting operation continuation processing of this flowchart ends. FIG. 6C will be described in detail later.

Note that the autofocus operation continuation processing is a processing for starting and stopping autofocus operations based on the remote control information list (described later). The autofocus operation continuation processing of step S626 is performed after it has been confirmed in step S624 that the shooting operations have been stopped, or after the shooting operations have been stopped in step S625. Accordingly, the state of the autofocus operations continuing does not change while the shooting operations are being performed. It is also possible to start the autofocus operations as soon as necessary by performing the processing of step S626 after the shooting operations have stopped in step S625.

FIG. 6C is a flowchart illustrating operations in the autofocus operation continuation processing performed by the control unit 101 in step S626 of FIG. 6B.

In step S630, the control unit 101 refers to the autofocus command state flag in all session IDs in the remote control information list, and determines whether any autofocus command state flag is set to "start". The control unit 101 moves the sequence to step S631 if any autofocus command state flag is set to "start", and to step S633 if all autofocus command state flags are not set to "start".

In step S631, the control unit 101 determines whether autofocus operations have already been started in the digital camera 100. The control unit 101 ends the autofocus operation continuation processing of this flowchart if the autofocus operations have already been started, and moves the sequence to step S632 if the autofocus operations have not been started.

In step S632, the control unit 101 starts autofocus operations, after which the autofocus operation continuation processing of this flowchart ends. However, the autofocus operations are performed continuously from the start to the stop. In other words, the autofocus operations are performed continuously until autofocus operation stop processing is performed in step S635 (described later).

If the AF operation mode is servo AF, the defocus amount in the focus detection region is continuously detected, and the focus lens is driven in accordance with the continuously-detected defocus amount, until the autofocus operation stop processing is performed. If the tracking AF mode is set, the focus detection region is automatically moved so as to continuously track the subject until the autofocus operation stop processing is performed, in both one-shot AF and servo AF.

In step S633, the control unit 101 refers to the autofocus command state flag in all session IDs in the remote control information list, and determines whether all the autofocus command state flags are set to "stop". The control unit 101 moves the sequence to step S634 if all autofocus command state flags are set to "stop", and ends the autofocus operation continuation processing of this flowchart if any autofocus command state flag is determined not to be set to "stop".

In step S634, the control unit 101 determines whether autofocus operations have already been stopped in the digital camera 100. The autofocus operation continuation processing of this flowchart is ended if the autofocus operations have already been stopped, and the sequence is moved to step S635 if the autofocus operations have not been stopped.

In step S635, the control unit 101 stops the autofocus operations that have already been started through the autofocus operation stop processing. The autofocus operation continuation processing of this flowchart then ends.

The foregoing has described a series of operations performed by the digital camera 100 in the present embodiment when the digital camera 100 performs processing in which commands are received from a plurality of control apparatuses 200 and autofocus and shooting are performed.

As described above, in the foregoing embodiment, shooting operations are started when the digital camera 100 first receives a shooting start command from any one of the control apparatuses 200. The shooting operations are continued until shooting stop commands are received from all the control apparatuses 200 that sent the start commands. On the other hand, when shooting stop commands are received from all the control apparatuses 200 that sent shooting start commands, the shooting operations are stopped.

Additionally, autofocus operations are started when an autofocus start command is first received from any one of the control apparatuses 200. The autofocus operations are continued until autofocus stop commands are received from all the control apparatuses 200 that sent the start commands. On the other hand, when autofocus stop commands are received from all the control apparatuses 200 that have sent autofocus start commands, the autofocus operations are stopped.

Through this, if one photographer attempts to take a shot while the digital camera is already taking a shot in response to a command from another photographer, the shooting will continue until the one photographer issues a stop command, which avoids a situation where the one photographer misses their chance for a shot.

Second Embodiment

The first embodiment described the following control. That is, autofocus processing is started when an autofocus start command is first received from any one of the control apparatuses 200. The autofocus processing is continued until autofocus stop commands are received from all the control apparatuses 200 that sent the start commands. The autofocus processing is then stopped when autofocus stop commands are received from all the control apparatuses 200 that sent the start commands.

On the other hand, if the AF operation mode set in the digital camera 100 is one-shot AF, the autofocus operations are started in step S632 of FIG. 6C, and automatic focus detection is performed in the focus detection region. Then, after the focus lens is driven to the in-focus position in accordance with the detected defocus amount, the driving of the focus lens is stopped. The focus position is then fixed until the autofocus operation stop processing is performed in step S635. Accordingly, even if the main subject moves, the automatic focus detection and focus lens driving are not continuously performed until the autofocus operation stop processing is performed after the first autofocus command is received from the control apparatus 200. In other words, there are cases where the main subject remains out of focus.

Accordingly, in the second embodiment, the autofocus control processing method is switched by referring to the AF operation mode. Specifically, when the AF operation mode is one-shot AF, the following processing is performed in addition to the autofocus continuation processing illustrated in FIG. 6C and described in the first embodiment. That is, the autofocus operations are stopped once when a predetermined condition (called an "autofocus retry condition" hereinafter) is satisfied, and the autofocus operations are immediately started again (a retry operation). Through this, the main subject can be brought back into focus by detecting the focus in the detection region again (performing focus detection) and moving the focus lens back to the in-focus position.

Constituent elements that are the same as those in the first embodiment will be given the same reference signs, and descriptions thereof will be omitted or simplified. Additionally, only some of the operations are different from those performed by the digital camera 100 in the first embodiment, illustrated in FIGS. 6A to 6C, and thus only the different parts will be described in the present embodiment.

Figure 8A:
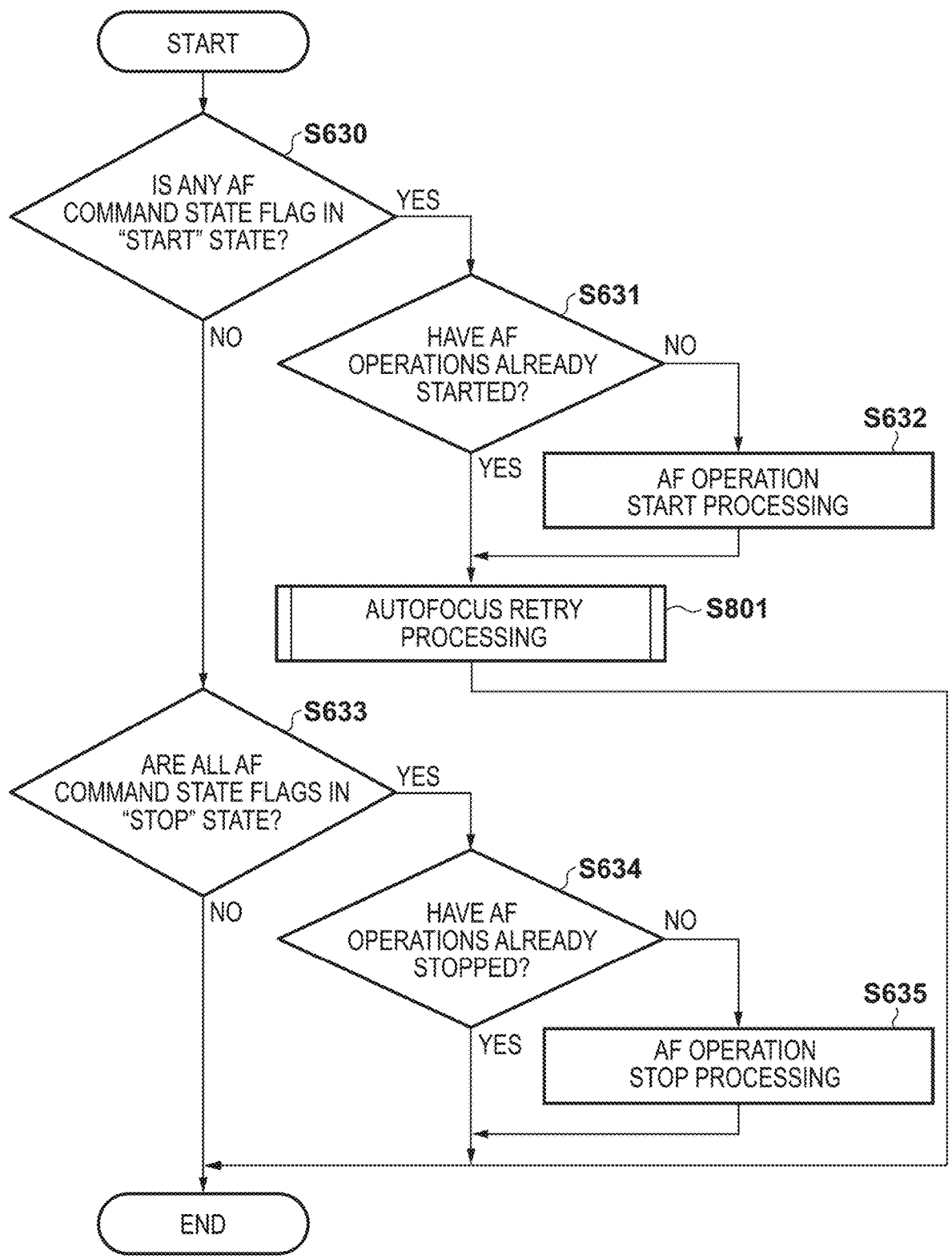
FIG. 8A is a flowchart illustrating operations performed by the digital camera according to a second embodiment.

FIGS. 8A and 8B are flowcharts illustrating operations performed by the digital camera 100 according to the present embodiment, and particularly illustrate the autofocus operation continuation processing in the series of operations.

FIG. 8A illustrates processing corresponding to FIG. 6C in the first embodiment.

In step S631, the control unit 101 of the digital camera 100 determines whether autofocus operations have already been started in the digital camera 100. The control unit 101 moves the sequence to step S801 if the sequence has not been started, and to step S632 if the sequence has been started, in the same manner as in FIG. 6C.

In step S801, the control unit 101 performs autofocus retry processing, illustrated in FIG. 8B, after which the autofocus operation continuation processing of this flowchart ends.

FIG. 8B is a flowchart illustrating operations in the autofocus retry processing performed by the digital camera 100 in step S801 of FIG. 8A.

In step S810, the control unit 101 determines whether the AF operation mode currently set is one-shot AF. The control unit 101 moves the sequence to step S811 if the AF operation mode is one-shot AF, and ends the autofocus retry processing of this flowchart if not.

In step S811, the control unit 101 determines whether the autofocus retry condition is satisfied. In the present embodiment, the control unit 101 makes the following determination as an example of an autofocus retry condition. In other words, it is determined whether any autofocus command state flag has been updated from "stop" to "start" when the remote control information list was updated in step S606 or step S609 of FIG. 6A. The control unit 101 moves the sequence to step S812 if a flag has been updated, and ends the autofocus retry processing of this flowchart if not.

In step S812, the control unit 101 ends the autofocus operations.

In step S813, the control unit 101 starts the autofocus operations. The autofocus retry processing of this flowchart then ends.

The foregoing has described operations of the digital camera 100 when the digital camera 100 receives commands from a plurality of control apparatuses 200, and performs autofocus and shooting, according to the second embodiment.

The following operations are performed as a result of the autofocus retry processing described above. That is, autofocus processing is started when an autofocus start command is first received from any one of the control apparatuses 200. Then, when an autofocus start command is received from any of the control apparatuses 200, the main subject is again brought into focus through autofocus until autofocus stop commands are received from all the control apparatuses 200 that sent start commands.

The present embodiment described the autofocus retry condition as being any autofocus command state flag being updated from "stop" to "start" when the remote control information list was updated in step S606 or step S609 of FIG. 6A. However, the autofocus retry condition is not limited thereto. For example, assume that it is determined whether any autofocus command state flag has been updated from "start" to "stop" when the remote control information list was updated in step S606 or step S609 of FIG. 6A. If the flag has been updated, the sequence moves to step S812. In other words, the processing for stopping and then restarting the autofocus operation is performed. If the flag has not been updated, the autofocus retry sequence ends.

The following operations are performed as a result of this autofocus retry processing. That is, autofocus processing is started when an autofocus start command is first received from any one of the control apparatuses 200. Then, when an autofocus stop command is received from any of the control apparatuses 200, the main subject is again brought into focus through autofocus until autofocus stop commands are received from all the control apparatuses 200 that sent start commands.

As described above, according to the second embodiment, the focus in the detection region can be detected again, and the main subject can be brought back into focus, even if the AF operation mode is one-shot AF and the main subject has moved.

Third Embodiment

Although the first and second embodiments described the control apparatus 200 as having display screens and operation members such as those illustrated in FIGS. 5A to 5F, those embodiments did not discuss operations in which the user designates a focus detection region (AF frame) during autofocus in the digital camera 100. When the digital camera 100 is set to the tracking AF mode, the digital camera 100 moves the focus detection region to automatically track the subject in accordance with the movement of the subject, and thus the user does not necessarily need to designate the AF frame. However, it is necessary to provide a configuration in which, when the tracking AF mode is not set, the user can designate the AF frame at a desired position.

Accordingly, a third embodiment will describe a configuration in which an AF frame is designated at a desired position by the user operating a control member in a display screen of the control apparatus 200.

Constituent elements that are the same as those in the first and second embodiments will be given the same reference signs, and descriptions thereof will be omitted or simplified. Additionally, in the present embodiment, only some of the screens displayed in the display unit 206 of the control apparatus 200 illustrated in FIGS. 5A to 5F, some of the operations performed by the control apparatus 200 illustrated in FIG. 4, and some of the operations in the processing performed by the digital camera 100 illustrated in FIG. 8, are different, and thus only these different parts will be described.

Figure 9:
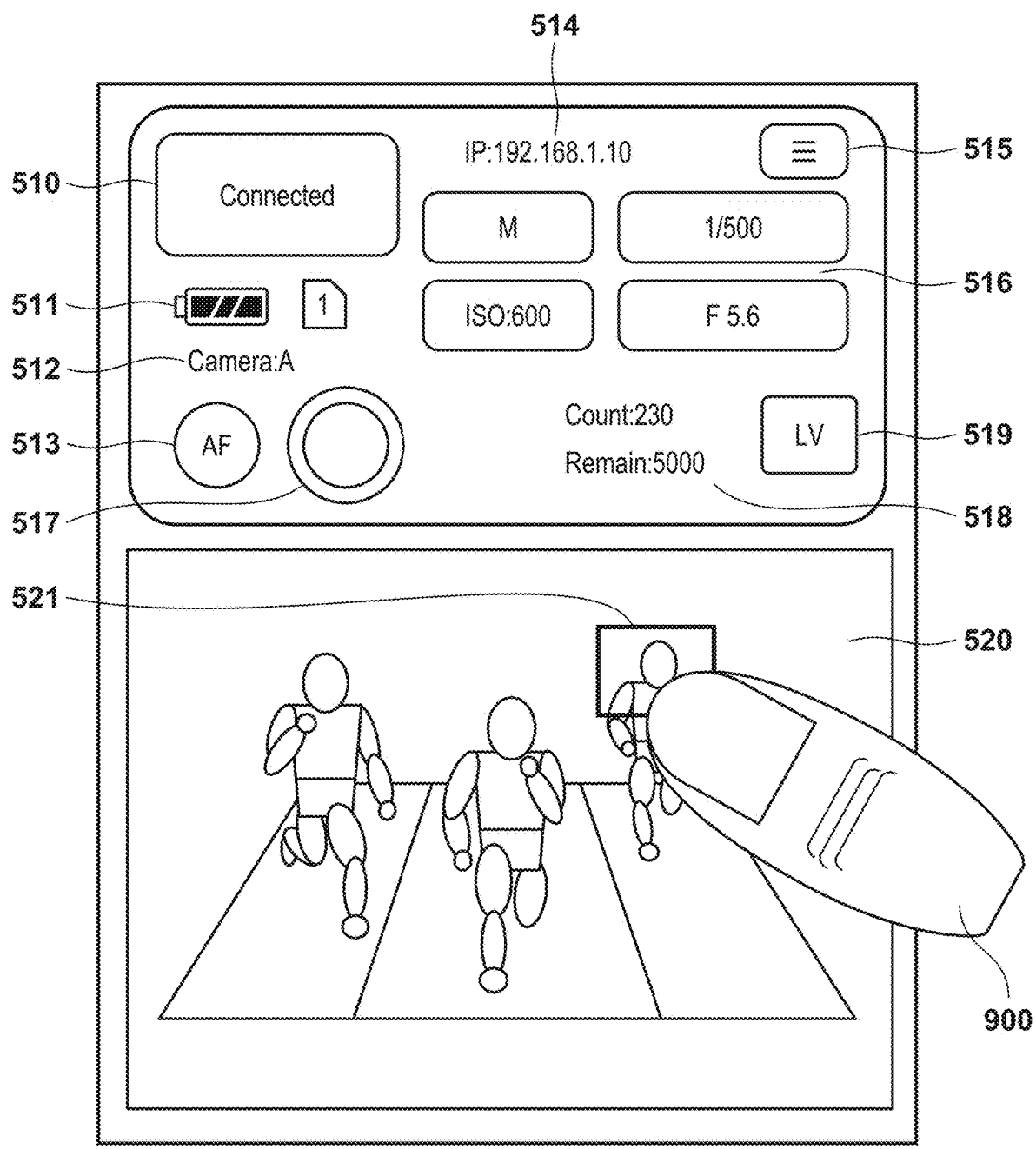
FIG. 9 is a diagram illustrating an example of a display screen of the control apparatus according to a third embodiment.

FIG. 9 illustrates operation members according to the third embodiment, and illustrates a part corresponding to the individual camera control section 501 illustrated in FIG. 5B and described in the first embodiment. In FIG. 9, by touching the live view display operation member 520 with a finger 900, an autofocus start command can be issued to the digital camera 100 in accordance with the touched position. Then, an autofocus end command can be issued by removing the finger from the live view display operation member 520. It should be noted that a change may be made to send the shooting control command in addition to the autofocus control command at any timing in the series of operations in which the live view display operation member 520 is touched and the touch is ended.

In the first embodiment, the control apparatus 200 carries out a series of processes in a sequence such as that illustrated in FIGS. 4A and 4B. In the third embodiment, the control apparatus 200 accepts not only operations of the autofocus control operation member and the shooting control operation member, but also operations of the live view display operation member 520, as illustrated in FIG. 4B. Upon detecting a touch on the live view display operation member 520, the control apparatus 200 sends information on the position in the live view screen corresponding to the touched position (called "AF frame information" hereinafter) and an autofocus start command to the digital camera 100. The display member 521, indicating the AF frame, is displayed at the touched position. Then, upon detecting that the touch has been stopped, an autofocus stop command is sent to the digital camera 100.

Figure 10A:
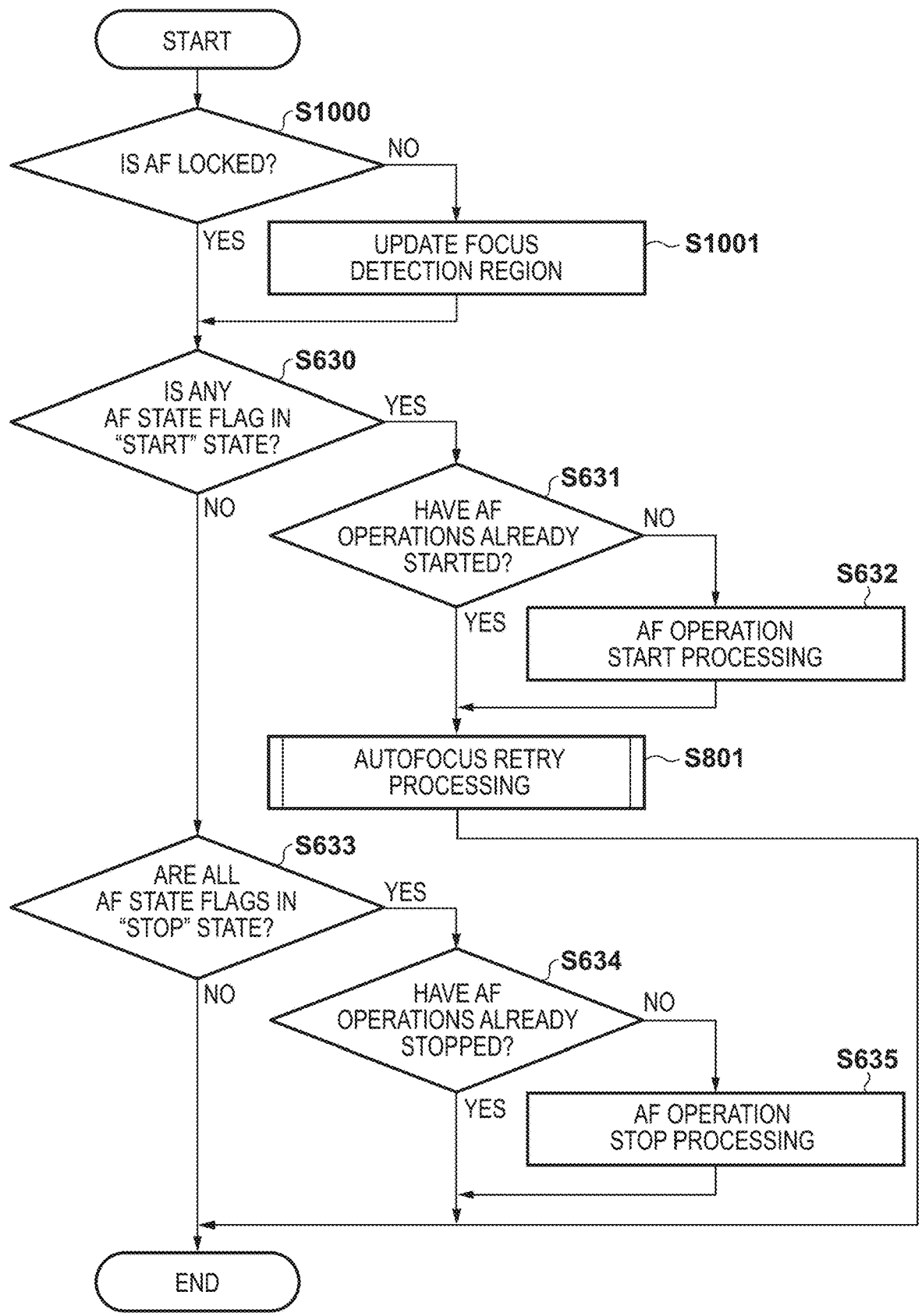
FIG. 10A is a flowchart illustrating operations performed by the digital camera according to the third embodiment.

FIGS. 10A and 10B are flowcharts illustrating operations performed by the digital camera 100 according to the present embodiment, and particularly illustrate the autofocus operation continuation processing in the series of operations.

FIG. 10A illustrates a part corresponding to FIG. 8A described in the second embodiment.

In step S1000, the control unit 101 determines whether the AF is locked. The control unit 101 moves the sequence to step S630 if the AF is locked, and moves the sequence to step S1001 if not. Note that the AF operation mode of the digital camera 100 is one-shot AF, and thus after the AF operation has already been started, the automatic focus detection is performed once, the focus lens is moved, and the focus lens position is then fixed. In other words, the AF is locked. Accordingly, the focus detection region cannot be moved while AF continues.

In step S1001, the control unit 101 calculates and updates the next autofocus focus detection region based on the AF frame information received with the autofocus start command in step S605 of FIG. 6A. The sequence then moves to step S630.

FIG. 10B illustrates a part corresponding to the autofocus retry processing in FIG. 8B described in the second embodiment.

In step S812, the control unit 101 ends the autofocus operations. The sequence then moves to step S1002.

In step S1002, like step S1001, the control unit 101 calculates and updates the next autofocus focus detection region based on the AF frame information received with the autofocus start command in step S605 of FIG. 6A. The sequence then moves to step S813.

Note that unlike step S1001, even if the AF operation mode of the digital camera 100 is one-shot AF, the AF operation is stopped in step S812, and thus the focus detection region can be moved.

In step S813, the digital camera 100 starts the autofocus operations. The autofocus retry processing of this flowchart then ends.

The foregoing has described operations of the digital camera 100 when the digital camera 100 receives commands from a plurality of control apparatuses 200, and performs autofocus and shooting, according to the third embodiment. In this manner, if the user has designated the AF frame, in the autofocus retry processing, the autofocus operations are stopped, the focus detection region is moved based on the AF frame designated by the user, and the autofocus operations are then started again.

The third embodiment described a method of calculating and updating the next autofocus focus detection region in step S1001 or step S1002, based on the latest AF frame information received in step S605 of FIG. 6. However, the method by which the digital camera 100 updates the focus detection region is not limited thereto.

For example, a method such as the following is also conceivable. The AF frame information received from the control apparatus 200 in step S605 of FIG. 6 is stored in the non-volatile memory 203, the working memory 204, or the recording medium 210 in combination with the session ID when the remote control information list is updated in step S606. Then, in step S1001 or step S1002, any desired AF frame is selected from the AF frame information associated with each session ID, the next autofocus focus detection region is calculated based on the selected AF frame, and the focus detection region is updated.

Variations

The first to third embodiments described a method of starting an autofocus operation equivalent to pressing the AF-ON button by sending autofocus start commands from a plurality of control apparatuses 200 to the digital camera 100. However, instead of the autofocus operation, the shooting preparation operation may be started by sending shooting preparation operation start commands to the digital camera 100 from the plurality of control apparatuses 200 when the release switch enters the SW1 state. In other words, instead of the control apparatus 200 controlling only the timings at which the autofocus operations start and stop, the control apparatus 200 may be configured to control the timings at which the shooting preparation operations start and stop, including the AF processing, the AE processing, the AWB processing, the EF processing, and the like.

The first to third embodiments described a method of sending shooting control commands and autofocus control commands to the digital camera 100 by detecting an operation of a control member displayed in the display unit 206 of the control apparatus 200. However, the method by which the control apparatus 200 controls the digital camera 100 is not limited thereto.

For example, the control apparatus 200 may have the same configuration as the digital camera 100 described above, and thus the digital camera 100 may be controlled by the control apparatus 200 using a tandem shooting function in the digital camera. "Tandem shooting function" is a function in which a plurality of digital cameras connected wirelessly or over wires shoot images in tandem.

For example, in the tandem shooting function, a digital camera operating in access point (AP) mode as a simple AP is called a "sender camera", and a digital camera operating in client (CL) mode as a CL device is called a "receiver camera". Each receiver camera is connected to the sender camera. When a user operates the sender camera and takes a shot, that operation is sent from the sender camera to the receiver cameras wirelessly connected thereto. Each receiver camera that receives this information performs shooting operations corresponding to the stated operation.

In the present invention, the sender camera in the tandem shooting function described above can be regarded as the control apparatus 200 according to the present embodiment, and the receiver camera can be regarded as the digital camera 100 according to the present embodiment.

For example, when the AF-ON button is pressed in the sender camera, an autofocus start command is sent to the receiver camera, and when the AF-ON button is released, an autofocus stop command is sent to the receiver camera. In addition, the sender camera sends a shooting start command to the receiver camera upon detecting that the release switch has entered the SW2 state. Additionally, a shooting stop command is sent to the receiver camera by detecting that the release switch has exited the SW2 state. The receiver camera can also receive and execute commands from a plurality of sender cameras to perform the series of operations executed by the digital camera 100 illustrated in FIGS. 6A, 6B, 8A, 8B, 10A, and 10B.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-135794, filed Aug. 23, 2023, which is hereby incorporated by reference herein in its entirety.

What is claimed is:

1. A control system in which an image capturing apparatus is controlled by a plurality of control apparatuses,
wherein each control apparatus includes:
at least one processor or circuit configured to function as:
a first communication unit that communicates with the image capturing apparatus;
a first instruction unit that outputs, to the image capturing apparatus, an instruction to start or stop an autofocus operation, the instruction being an instruction related to the autofocus operation; and
a second instruction unit that outputs, to the image capturing apparatus, an instruction to start or stop a shooting operation, the instruction being an instruction related to the shooting operation,
the image capturing apparatus includes:
at least one processor or circuit configured to function as:
a second communication unit that communicates with each of the control apparatuses; and
a control unit;
an image capturing device that performs the shooting operation; and
an optical imaging system that performs the autofocus operation,
wherein when the instruction to start the shooting operation is first received from any one control apparatus among the plurality of control apparatuses, the control unit performs control to start the shooting operation, and continue the shooting operation until the instruction to stop the shooting operation is received from all of the control apparatuses that have sent the instruction to start the shooting operation, and
when the instruction to start the autofocus operation is first received from any one control apparatus among the plurality of control apparatuses, the control unit performs control to start the autofocus operation, and continue the autofocus operation until the instruction to stop the autofocus operation is received from all the control apparatuses that have sent the instruction to start the autofocus operation.

2. The control system according to claim 1,
wherein the image capturing apparatus further includes a storage device that stores a list of newest content of the instruction related to the autofocus operation and the instruction related to the shooting operation from the plurality of control apparatuses, in a form that enables the control apparatuses to be distinguished from each other.

3. The control system according to claim 2,
wherein the control unit controls the start and stop of the autofocus operation and the start and stop of the shooting operation based on the list.

4. The control system according to claim 3,
wherein for a control apparatus for which a connection has ended, the storage device deletes the list corresponding to the control apparatus.

5. The control system according to claim 2,
wherein if, when the shooting operation is stopped, the instruction related to the autofocus operation from any one of the control apparatuses in the list is an instruction to start autofocus, the control unit starts the autofocus operation.

6. The control system according to claim 2,
wherein when a condition for performing the autofocus operation again is satisfied, the control unit performs a retry operation that stops the autofocus operation and starts the autofocus operation again.

7. The control system according to claim 6,
wherein when the instruction related to the autofocus operation from any one of the control apparatuses in the list is updated from stopping to starting the autofocus operation, the control unit determines that the condition for performing the autofocus operation again is satisfied.

8. The control system according to claim 6,
wherein when the instruction related to the autofocus operation from any one of the control apparatuses in the list is updated from starting to stopping the autofocus operation, the control unit determines that the condition for performing the autofocus operation again is satisfied.

9. The control system according to claim 6,
wherein the control unit switches whether to perform the retry operation in accordance with a mode of the autofocus operation.

10. The control system according to claim 9,
wherein the control unit skips the retry operation when the mode of the autofocus operation is servo AF, and performs the retry operation when the mode of the autofocus operation is one-shot AF.

11. The control system according to claim 1, comprising:
a plurality of image capturing apparatuses, each being the image capturing apparatus.

12. The control system according to claim 1,
wherein each of the control apparatuses is an image capturing apparatus.

13. An image capturing apparatus controlled by a plurality of control apparatuses, the image capturing apparatus comprising:
at least one processor or circuit configured to function as:
a communication unit that communicates with each of the control apparatuses; and
a control unit;
an image capturing device that performs the shooting operation; and
an optical imaging system that performs the autofocus operation,
wherein when the instruction to start the shooting operation is first received from any one control apparatus among the plurality of control apparatuses, the control unit performs control to start the shooting operation, and continue the shooting operation until the instruction to stop the shooting operation is received from all of the control apparatuses that have sent the instruction to start the shooting operation, and when the instruction to start the autofocus operation is first received from any one control apparatus among the plurality of control apparatuses, the control unit performs control to start the autofocus operation, and continue the autofocus operation until the instruction to stop the autofocus operation is received from all the control apparatuses that have sent the instruction to start the autofocus operation.

14. A method of controlling an image capturing apparatus that is controlled by a plurality of control apparatuses, the image capturing apparatus including at least one processor or circuit configured to function as a communication unit that communicates with the control apparatuses, an image capturing device that performs a shooting operation, and an optical imaging system that performs an autofocus operations, the method comprising:

when an instruction to start the shooting operation is first received from any one of the plurality of control apparatuses, performing control to start the shooting operation, and continue the shooting operation until an instruction to stop the shooting operation is received from all of the control apparatuses that have sent the instruction to start the shooting operation; and when an instruction to start the autofocus operation is first received from any one of the plurality of control apparatuses, performing control to start the autofocus operation, and continue the autofocus operation until an instruction to stop the autofocus operation is received from all the control apparatuses that have sent the instruction to start the autofocus operation.

15. A non-transitory computer-readable storage medium in which is stored a program for causing a computer to execute the method of controlling an image capturing apparatus that is controlled by a plurality of control apparatuses, the image capturing apparatus including at least one processor or circuit configured to function as a communication unit that communicates with the control apparatuses, an image capturing device that performs a shooting operation, and an optical imaging system that performs an autofocus operations, the method comprising:

when an instruction to start the shooting operation is first received from any one of the plurality of control apparatuses, performing control to start the shooting operation, and continue the shooting operation until an instruction to stop the shooting operation is received from all of the control apparatuses that have sent the instruction to start the shooting operation; and when an instruction to start the autofocus operation is first received from any one of the plurality of control apparatuses, performing control to start the autofocus operation, and continue the autofocus operation until an instruction to stop the autofocus operation is received from all the control apparatuses that have sent the instruction to start the autofocus operation.

* * * * *